United States Patent
Zhao et al.

(10) Patent No.: US 11,847,572 B2
(45) Date of Patent: *Dec. 19, 2023

(54) METHOD, SYSTEM, AND COMPUTER PROGRAM PRODUCT FOR DETECTING FRAUDULENT INTERACTIONS

(71) Applicant: Visa International Service Association, San Francisco, CA (US)

(72) Inventors: Hangqi Zhao, Seattle, WA (US); Fan Yang, Belmont, MA (US); Chiranjeet Chetia, Round Rock, TX (US); Claudia Carolina Barcenas Cardenas, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,636

(22) Filed: Sep. 13, 2022

(65) Prior Publication Data

US 2023/0004759 A1     Jan. 5, 2023

Related U.S. Application Data

(63) Continuation of application No. 16/541,849, filed on Aug. 15, 2019, now Pat. No. 11,468,272.

(51) Int. Cl.
*G06V 10/00* (2022.01)
*G06N 3/084* (2023.01)
(Continued)

(52) U.S. Cl.
CPC ......... *G06N 3/084* (2013.01); *G06F 18/2132* (2023.01); *G06F 18/2148* (2023.01); *G06F 18/2185* (2023.01); *G06N 3/045* (2023.01)

(58) Field of Classification Search
CPC .......... G06N 3/08; G06N 3/084; G06N 3/045; G06N 3/047; G06N 3/0454; G06N 3/02;
(Continued)

(56) References Cited

U.S. PATENT DOCUMENTS

| 5,819,226 A | * | 10/1998 | Gopinathan | ........... G06Q 20/40 705/44 |
| 5,949,045 A | * | 9/1999 | Ezawa | ................... G06Q 40/08 705/16 |

(Continued)

OTHER PUBLICATIONS

Li et al., "Triple Generative Adversarial Nets", 31st Conference on Neural Information Processing Systems (NIPS 2017), 2017, 11 pages, Long Beach, CA.
(Continued)

*Primary Examiner* — Amir Alavi
(74) *Attorney, Agent, or Firm* — THE WEBB LAW FIRM

(57) ABSTRACT

A method for detecting fraudulent interactions may include receiving interaction data, including a first plurality of interactions with (first) fraud labels and a second plurality of interactions (without fraud labels). Second fraud label data for each of the second plurality of interactions may be generated with a first neural network (e.g., classifying whether each interaction is fraudulent or not). Generated interaction data and generated fraud label data may be generated with a second neural network. Discrimination data for each of the second plurality of interactions and generated interactions may be generated with a third neural network (e.g., classifying whether the respective interaction is real or not). Error data may be determined based on the discrimination data (e.g., whether the respective interaction is correctly classified). At least one of the neural networks may be trained based on the error data. A system and computer program product are also disclosed.

20 Claims, 8 Drawing Sheets

(51) Int. Cl.
*G06F 18/21* (2023.01)
*G06F 18/2132* (2023.01)
*G06F 18/214* (2023.01)
*G06N 3/045* (2023.01)

(58) Field of Classification Search
CPC ........ G06N 3/088; G06N 3/086; G06N 3/082; G06N 20/00; G06V 10/70; G06V 10/774; G06V 10/776; G06V 30/19147; G06K 9/6264; G06K 9/6234; G06K 9/6257; G06T 3/4046; G06T 2207/20081; G06T 2207/20084; G06T 9/002; G06F 18/2132; G06F 18/2148; G06F 18/2185; G06F 18/24133; G06F 18/2155
See application file for complete search history.

(56) References Cited

U.S. PATENT DOCUMENTS

| | | | | |
|---|---|---|---|---|
| 6,067,535 | A * | 5/2000 | Hobson | G06Q 30/02 706/16 |
| 6,920,440 | B1 | 7/2005 | Barson | |
| 7,089,592 | B2 * | 8/2006 | Adjaoute | G06Q 20/04 726/1 |
| 8,413,894 | B2 * | 4/2013 | Bona | G06Q 20/385 235/487 |
| 8,458,069 | B2 | 6/2013 | Adjaoute | |
| 8,594,730 | B2 * | 11/2013 | Bona | G06Q 20/341 455/554.2 |
| 8,935,783 | B2 | 1/2015 | Toma et al. | |
| 9,231,979 | B2 | 1/2016 | Duke et al. | |
| 9,953,321 | B2 * | 4/2018 | Zoldi | G06Q 20/4016 |
| 10,482,466 | B1 * | 11/2019 | Walters | G06N 3/08 |
| 10,692,058 | B2 | 6/2020 | Zoldi et al. | |
| 10,769,896 | B1 * | 9/2020 | Farivar | G06V 40/28 |
| 10,825,028 | B1 | 11/2020 | Kramme et al. | |
| 11,276,023 | B1 | 3/2022 | Butler et al. | |
| 11,348,122 | B1 | 5/2022 | Kramme et al. | |
| 11,463,475 | B1 * | 10/2022 | Colon | H04M 3/42195 |
| 11,468,272 | B2 * | 10/2022 | Zhao | G06N 3/084 |
| 2017/0262852 | A1 * | 9/2017 | Florimond | G06N 3/08 |
| 2021/0049418 | A1 | 2/2021 | Zhao et al. | |

OTHER PUBLICATIONS

Nash, "Create Data from Random Noise with Generative Adversarial Networks", Toptal, 2019, 23 pages, retrieved from https://www.toptal.com/machine-learning/generative-adversarial-networks.

* cited by examiner

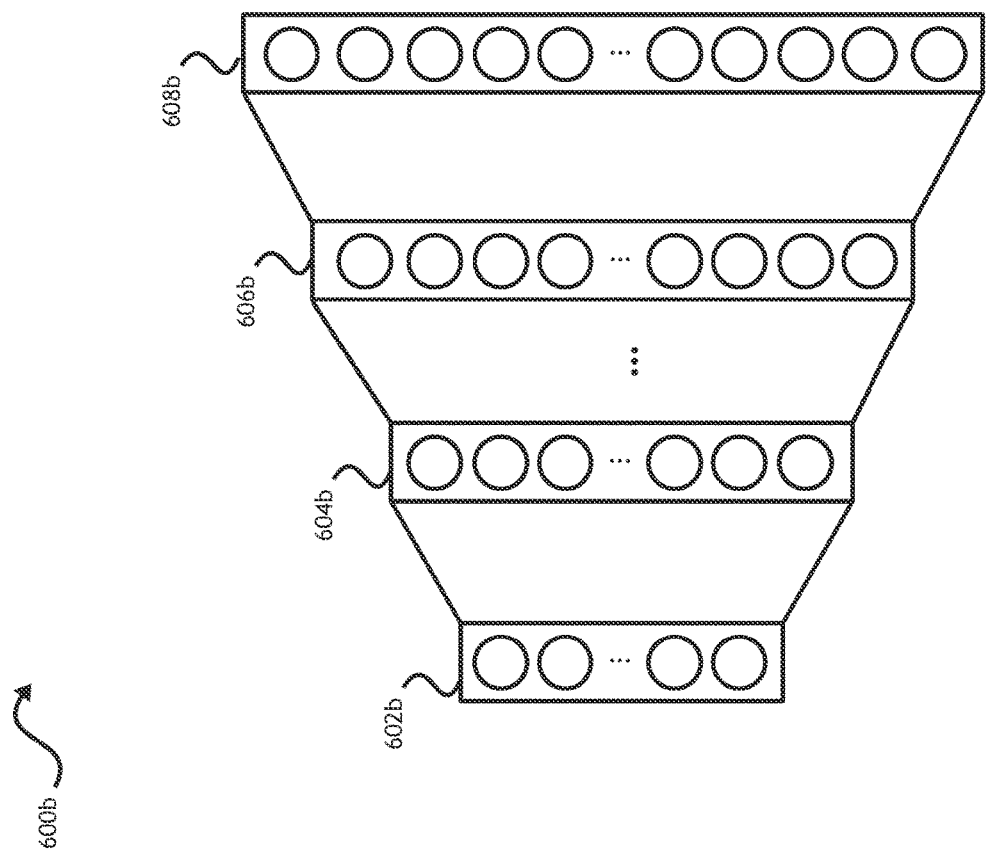

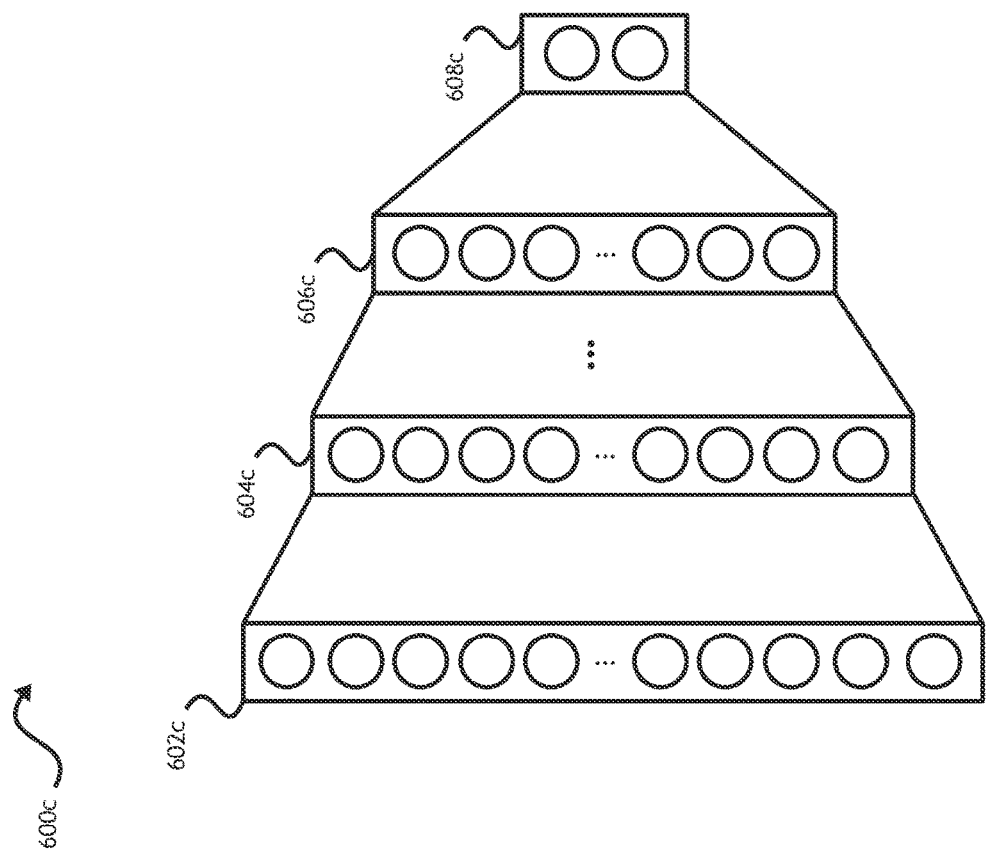

US 11,847,572 B2

METHOD, SYSTEM, AND COMPUTER PROGRAM PRODUCT FOR DETECTING FRAUDULENT INTERACTIONS

CROSS-REFERENCE TO RELATED APPLICATION

This application is a continuation of U.S. patent application Ser. No. 16/541,849, filed Aug. 15, 2019, the disclosure of which is hereby incorporated by reference in its entirety.

BACKGROUND

1. Field

This disclosed subject matter relates generally to methods, systems, and products for detecting fraudulent interactions and, in some particular embodiments, to a method, system, and computer program product for detecting fraudulent interactions using multiple neural networks.

2. Technical Considerations

Certain institutions (e.g., transaction service providers, issuers, acquirers, merchants, and/or the like) may process a high volume of transactions (e.g., authorization requests and/or authorization responses) every day. For example, a transaction service provider system in an electronic payment processing network may process thousands of transactions per second. Some transactions may be fraudulent, but it may be difficult to determine which transactions are potentially and/or actually fraudulent. For example, certain institutions may rely on manual review of transactions to identify fraud. Additionally or alternatively, certain institutions (e.g., computer systems thereof) may employ various predefined rules or score functions for assessing the likelihood that a transaction is fraudulent. For example, a transaction flagged based on the predefined rules/scoring may be forwarded to an individual for manual review. Additionally or alternatively, after manual review of the transactions, labels (e.g., fraud, not fraud, and/or the like) may be assigned to the reviewed transactions, and a classifier (e.g., neural network and/or the like) may be trained to detect fraud in other transactions after being trained with the labeled transactions.

However, manual review may be burdensome, time consuming, and/or expensive in terms of manual efforts. As such, only a small portion of all transactions may be manually reviewed. Moreover, as only a small portion of all transactions are reviewed and labeled, a large portion of all transactions may remain unlabeled. Such unlabeled transactions may be unsuitable (e.g., not useful and/or the like) for machine learning (e.g., supervised learning in classifiers such as neural networks and/or the like). Further, predefined rules may be designed to detect fraudulent transactions under certain known circumstances (e.g., known patterns of fraudsters and/or the like), but such rules may be unsuitable for detecting or adjusting to new patterns employed by fraudsters to overcome such rules (e.g., it may be difficult to adjust such rules, designers of such rules may remain unaware of such new patterns, and/or the like). In addition, such classifiers (e.g., neural networks, machine learning models, and/or the like) trained on the small portion of transactions for which labels are provided may lack sufficient data for training, and therefore, such classifiers may be unsuitable for (e.g., unable to, inadequate for, and/or the like) detecting complex patterns, new patterns, and/or the like.

A generative adversarial network (GAN) may be used to create high quality fake data meant to resemble real data. Certain GANs may employ two machine learning models (e.g., neural networks and/or the like), which may be referred to a generator and a discriminator. For example, the generator may be a neural network that transforms an input (e.g., a vector of random values (e.g., a random noise vector) and/or the like) into fake data. Additionally, the discriminator may be a neural network that receives the fake data from the generator (and/or some real data) as an input and classifies the input as real or fake (e.g., determines a probability that the input is real or fake). The discriminator's classification may be correct or incorrect (e.g., an error and/or the like). Information regarding errors (e.g., error for each input, error rate over multiple inputs, and/or the like) may be used for training of the generator and/or the discriminator. For example, the generator may be trained to attempt to increase the errors (e.g., increase the likelihood for an error for each input, increase the error rate, and/or the like) and/or the discriminator may be trained to decrease the errors (e.g., decrease the likelihood for an error for each input, decrease the error rate, and/or the like). Over time (e.g., after a number of training iterations and/or the like), the generator may improve at generating fake data and/or the discriminator may improve at classifying inputs as real or fake.

However, GANs may be insufficient (e.g., unable, inadequate, and/or the like) to classify what type of data the real data is (e.g., to provide labels for the real data). If the real data includes images, each image may be converted into a vector representation for inputting into the discriminator, and the discriminator may be able to classify that vector representation as real or fake. Yet, the discriminator may be insufficient (e.g., unable, inadequate, and/or the like) to classify what is depicted in the image (or even that the vector representation is an image as opposed to some other type of data). Similarly, if the real data is transaction data, a fraudulent transaction may be a real transaction, and the discriminator may be able to classify the transaction data thereof as real or fake. Yet, the discriminator may be insufficient (e.g., unable, inadequate, and/or the like) to classify whether the transaction is fraudulent.

SUMMARY

Accordingly, it is an object of the presently disclosed subject matter to provide methods, systems, and computer program products for detecting fraudulent interactions, e.g., using multiple neural networks.

According to non-limiting embodiments, provided is a method for detecting fraudulent interactions. In some non-limiting embodiments, a method for detecting fraudulent interactions may include receiving interaction data associated with a plurality of interactions. The plurality of interactions may include a first plurality of interactions and a second plurality of interactions different than the first plurality of interactions. First fraud label data for each respective interaction of the first plurality of interactions may be received. The first fraud label data may be associated with whether the respective interaction of the first plurality of interactions is fraudulent. Second fraud label data for each interaction of the second plurality of interactions may be generated with a first neural network based on the interaction data of the second plurality of interactions. The second fraud label data for each respective interaction of the second plurality of interactions may be associated with whether the first neural network classifies the respective interaction as fraudulent. Generated interaction data associated with a plurality of generated interactions and generated fraud label data for each generated interaction of the plurality of generated interactions may be generated with a second neural network. Discrimination data for each interaction of the second plurality of interactions and each generated interaction of the plurality of generated interactions may be generated with a third neural network based on the interaction data for each interaction of the second plurality of interactions, the second fraud label data, the generated interaction data, and the generated fraud label data. The discrimination data for each interaction or generated interaction may be associated with whether the third neural network classifies the respective interaction or generated interaction as real or generated. First error data for each respective interaction of the second plurality of interactions may be determined based on the discrimination data. The first error data for each respective interaction may be associated with whether the discrimination data for the respective interaction correctly classifies the respective interaction as real. The first neural network may be trained based on the first error data associated with the interactions of the second plurality of interactions.

In some non-limiting embodiments, the first neural network may be trained (e.g., initially trained, further trained, and/or the like) based on the interaction data of the first plurality of transactions and the first fraud label data. Additionally or alternatively, the first neural network may be trained (e.g., further trained and/or the like) based on the generated interaction data and the generated fraud label data.

In some non-limiting embodiments, second error data for each generated interaction of the generated interaction data may be determined based on the discrimination data. Additionally or alternatively, the second error data for each respective generated interaction may be associated with whether the discrimination data for the respective generated interaction correctly classifies the respective generated interaction as generated. Additionally or alternatively, the second neural network may be trained based on the second error data associated with the generated interactions of the generated interaction data.

In some non-limiting embodiments, the third neural network may be trained based on at least one of the first error data, the second error data, the interaction data of the first plurality of transactions, the first fraud label data, or any combination thereof.

In some non-limiting embodiments, at least one random vector may be generated. Generating the generated interaction data and the generated fraud label data may include generating the generated interaction data associated with the plurality of generated interactions and the generated fraud label data for each generated interaction of the plurality of generated interactions with the second neural network based on the at least one random vector.

In some non-limiting embodiments, the first neural network may include a classifier. Additionally or alternatively, the second neural network may include a generator. Additionally or alternatively, the third neural network may include a discriminator.

In some non-limiting embodiments, the interaction data may have a first number of features and the generated interaction data may have the (same) first number of features. Additionally or alternatively, the at least one random vector may have a second number of features less than the first number of features. Additionally or alternatively, the generator may include an input for each feature of the second number of features and an output for each feature of the first number of features. Additionally or alternatively, the classifier may include an input for each feature of the first number of features, and the classifier may include a single output or two outputs. Additionally or alternatively, the discriminator may include an input for each feature of the first number of features, and the discriminator may include a single output or two outputs.

In some non-limiting embodiments, the first neural network may include at least one of a first multilayer perceptron (MLP), a first fully connected neural network, a first deep neural network, a first convolutional neural network, any combination thereof, and/or the like. Additionally or alternatively, the second neural network may include at least one of a second MLP, a second fully connected neural network, a second deep neural network, a second convolutional neural network, any combination thereof, and/or the like. Additionally or alternatively, the third neural network may include at least one of a third MLP, a third fully connected neural network, a third deep neural network, a third convolutional neural network, any combination thereof, and/or the like.

In some non-limiting embodiments, further interaction data associated with at least one further interaction may be received. Additionally or alternatively, further fraud label data for the at least one further interaction may be generated with the first neural network based on the further interaction data. Additionally or alternatively, the further fraud label data for the at least one further interaction may be associated with whether the first neural network classifies the at least one further interaction as fraudulent.

According to non-limiting embodiments, provided is a system for detecting fraudulent interactions. In some non-limiting embodiments, the system for detecting fraudulent interactions may include at least one processor and at least one non-transitory computer-readable medium comprising instructions to direct the at least one processor to receive interaction data associated with a plurality of interactions. The plurality of interactions may include a first plurality of interactions and a second plurality of interactions different than the first plurality of interactions. First fraud label data for each respective interaction of the first plurality of interactions may be received. The first fraud label data may be associated with whether the respective interaction of the first plurality of interactions is fraudulent. Second fraud label data for each interaction of the second plurality of interactions may be generated with a first neural network based on the interaction data of the second plurality of interactions. The second fraud label data for each respective interaction of the second plurality of interactions may be associated with whether the first neural network classifies the respective interaction as fraudulent. Generated interaction data associated with a plurality of generated interactions and generated fraud label data for each generated interaction of the plurality of generated interactions may be generated with a second neural network. Discrimination data for each interaction of the second plurality of interactions and each generated interaction of the plurality of generated interactions may be generated with a third neural network based on the interaction data for each interaction of the second plurality of interactions, the second fraud label data, the generated interaction data, and the generated fraud label data. The discrimination data for each interaction or generated interaction may be associated with whether the third neural network classifies the respective interaction or generated interaction as real or generated. First error data for each respective interaction of the second plurality of interactions may be determined based on the discrimination data. The first error data for each respective interaction may be associated with whether the discrimination data for the respective interaction correctly classifies the respective interaction as real. The first neural network may be trained based on the first error data associated with the interactions of the second plurality of interactions.

In some non-limiting embodiments, the first neural network may be trained (e.g., initially trained, further trained, and/or the like) based on the interaction data of the first plurality of transactions and the first fraud label data. Additionally or alternatively, the first neural network may be trained (e.g., further trained and/or the like) based on the generated interaction data and the generated fraud label data.

In some non-limiting embodiments, second error data for each generated interaction of the generated interaction data may be determined based on the discrimination data. Additionally or alternatively, the second error data for each respective generated interaction may be associated with whether the discrimination data for the respective generated interaction correctly classifies the respective generated interaction as generated. Additionally or alternatively, the second neural network may be trained based on the second error data associated with the generated interactions of the generated interaction data.

In some non-limiting embodiments, the third neural network may be trained based on at least one of the first error data, the second error data, the interaction data of the first plurality of transactions, the first fraud label data, or any combination thereof.

In some non-limiting embodiments, at least one random vector may be generated. Generating the generated interaction data and the generated fraud label data may include generating the generated interaction data associated with the plurality of generated interactions and the generated fraud label data for each generated interaction of the plurality of generated interactions with the second neural network based on the at least one random vector.

In some non-limiting embodiments, the first neural network may include a classifier. Additionally or alternatively, the second neural network may include a generator. Additionally or alternatively, the third neural network may include a discriminator.

In some non-limiting embodiments, the interaction data may have a first number of features and the generated interaction data may have the (same) first number of features. Additionally or alternatively, the at least one random vector may have a second number of features less than the first number of features. Additionally or alternatively, the generator may include an input for each feature of the second number of features and an output for each feature of the first number of features. Additionally or alternatively, the classifier may include an input for each feature of the first number of features, and the classifier may include a single output or two outputs. Additionally or alternatively, the discriminator may include an input for each feature of the first number of features, and the discriminator may include a single output or two outputs.

In some non-limiting embodiments, the first neural network may include at least one of a first multilayer perceptron (MLP), a first fully connected neural network, a first deep neural network, a first convolutional neural network, any combination thereof, and/or the like. Additionally or alternatively, the second neural network may include at least one of a second MLP, a second fully connected neural network, a second deep neural network, a second convolutional neural network, any combination thereof, and/or the like. Additionally or alternatively, the third neural network may include at least one of a third MLP, a third fully connected neural network, a third deep neural network, a third convolutional neural network, any combination thereof, and/or the like.

In some non-limiting embodiments, further interaction data associated with at least one further interaction may be received. Additionally or alternatively, further fraud label data for the at least one further interaction may be generated with the first neural network based on the further interaction data. Additionally or alternatively, the further fraud label data for the at least one further interaction may be associated with whether the first neural network classifies the at least one further interaction as fraudulent.

According to non-limiting embodiments, provided is a computer program product for detecting fraudulent interactions. The computer program product may include at least one non-transitory computer-readable medium including one or more instructions that, when executed by at least one processor, cause the at least one processor to receive interaction data associated with a plurality of interactions. The plurality of interactions may include a first plurality of interactions and a second plurality of interactions different than the first plurality of interactions. First fraud label data for each respective interaction of the first plurality of interactions may be received. The first fraud label data may be associated with whether the respective interaction of the first plurality of interactions is fraudulent. Second fraud label data for each interaction of the second plurality of interactions may be generated with a first neural network based on the interaction data of the second plurality of interactions. The second fraud label data for each respective interaction of the second plurality of interactions may be associated with whether the first neural network classifies the respective interaction as fraudulent. Generated interaction data associated with a plurality of generated interactions and generated fraud label data for each generated interaction of the plurality of generated interactions may be generated with a second neural network. Discrimination data for each interaction of the second plurality of interactions and each generated interaction of the plurality of generated interactions may be generated with a third neural network based on the interaction data for each interaction of the second plurality of interactions, the second fraud label data, the generated interaction data, and the generated fraud label data. The discrimination data for each interaction or generated interaction may be associated with whether the third neural network classifies the respective interaction or generated interaction as real or generated. First error data for each respective interaction of the second plurality of interactions may be determined based on the discrimination data. The first error data for each respective interaction may be associated with whether the discrimination data for the respective interaction correctly classifies the respective interaction as real. The first neural network may be trained based on the first error data associated with the interactions of the second plurality of interactions.

In some non-limiting embodiments, the first neural network may be trained (e.g., initially trained, further trained, and/or the like) based on the interaction data of the first plurality of transactions and the first fraud label data. Additionally or alternatively, the first neural network may be trained (e.g., further trained and/or the like) based on the generated interaction data and the generated fraud label data.

In some non-limiting embodiments, second error data for each generated interaction of the generated interaction data may be determined based on the discrimination data. Additionally or alternatively, the second error data for each respective generated interaction may be associated with whether the discrimination data for the respective generated interaction correctly classifies the respective generated interaction as generated. Additionally or alternatively, the second neural network may be trained based on the second error data associated with the generated interactions of the generated interaction data.

In some non-limiting embodiments, the third neural network may be trained based on at least one of the first error data, the second error data, the interaction data of the first plurality of transactions, the first fraud label data, or any combination thereof.

In some non-limiting embodiments, at least one random vector may be generated. Generating the generated interaction data and the generated fraud label data may include generating the generated interaction data associated with the plurality of generated interactions and the generated fraud label data for each generated interaction of the plurality of generated interactions with the second neural network based on the at least one random vector.

In some non-limiting embodiments, the first neural network may include a classifier. Additionally or alternatively, the second neural network may include a generator. Additionally or alternatively, the third neural network may include a discriminator.

In some non-limiting embodiments, the interaction data may have a first number of features and the generated interaction data may have the (same) first number of features. Additionally or alternatively, the at least one random vector may have a second number of features less than the first number of features. Additionally or alternatively, the generator may include an input for each feature of the second number of features and an output for each feature of the first number of features. Additionally or alternatively, the classifier may include an input for each feature of the first number of features, and the classifier may include a single output or two outputs. Additionally or alternatively, the discriminator may include an input for each feature of the first number of features, and the discriminator may include a single output or two outputs.

In some non-limiting embodiments, the first neural network may include at least one of a first multilayer perceptron (MLP), a first fully connected neural network, a first deep neural network, a first convolutional neural network, any combination thereof, and/or the like. Additionally or alternatively, the second neural network may include at least one of a second MLP, a second fully connected neural network, a second deep neural network, a second convolutional neural network, any combination thereof, and/or the like. Additionally or alternatively, the third neural network may include at least one of a third MLP, a third fully connected neural network, a third deep neural network, a third convolutional neural network, any combination thereof, and/or the like.

In some non-limiting embodiments, further interaction data associated with at least one further interaction may be received. Additionally or alternatively, further fraud label data for the at least one further interaction may be generated with the first neural network based on the further interaction data. Additionally or alternatively, the further fraud label data for the at least one further interaction may be associated with whether the first neural network classifies the at least one further interaction as fraudulent.

Further embodiments are set forth in the following numbered clauses:

Clause 1: A method for detecting fraudulent interactions, comprising: receiving, with at least one processor, interaction data associated with a plurality of interactions, the plurality of interactions comprising a first plurality of interactions and a second plurality of interactions different than the first plurality of interactions; receiving, with at least one processor, first fraud label data for each respective interaction of the first plurality of interactions, the first fraud label data associated with whether the respective interaction of the first plurality of interactions is fraudulent; generating, with at least one processor, second fraud label data for each interaction of the second plurality of interactions with a first neural network based on the interaction data of the second plurality of interactions, the second fraud label data for each respective interaction of the second plurality of interactions associated with whether the first neural network classifies the respective interaction as fraudulent; generating, with at least one processor, generated interaction data associated with a plurality of generated interactions and generated fraud label data for each generated interaction of the plurality of generated interactions with a second neural network; generating, with at least one processor, discrimination data for each interaction of the second plurality of interactions and each generated interaction of the plurality of generated interactions with a third neural network based on the interaction data for each interaction of the second plurality of interactions, the second fraud label data, the generated interaction data, and the generated fraud label data, the discrimination data for each interaction or generated interaction associated with whether the third neural network classifies the respective interaction or generated interaction as real or generated; determining, with at least one processor, first error data for each respective interaction of the second plurality of interactions based on the discrimination data, the first error data for each respective interaction associated with whether the discrimination data for the respective interaction correctly classifies the respective interaction as real; and training, with at least one processor, the first neural network based on the first error data associated with the interactions of the second plurality of interactions.

Clause 2: The method of clause 1, further comprising training, with at least one processor, the first neural network based on the interaction data of the first plurality of transactions and the first fraud label data.

Clause 3: The method of any preceding clause, further comprising training, with at least one processor, the first neural network based on the generated interaction data and the generated fraud label data.

Clause 4: The method of any preceding clause, further comprising: determining, with at least one processor, second error data for each generated interaction of the generated interaction data based on the discrimination data, the second error data for each respective generated interaction associated with whether the discrimination data for the respective generated interaction correctly classifies the respective generated interaction as generated; and training, with at least one processor, the second neural network based on the second error data associated with the generated interactions of the generated interaction data.

Clause 5: The method of any preceding clause, further comprising: training, with at least one processor, the third neural network based on at least one of the first error data, the second error data, the interaction data of the first plurality of transactions, the first fraud label data, or any combination thereof.

Clause 6: The method of any preceding clause, further comprising generating, with at least one processor, at least one random vector, wherein generating the generated interaction data and the generated fraud label data comprises generating, with at least one processor, the generated interaction data associated with the plurality of generated interactions and the generated fraud label data for each generated interaction of the plurality of generated interactions with the second neural network based on the at least one random vector.

Clause 7: The method of any preceding clause, wherein the first neural network comprises a classifier, the second neural network comprises a generator, and the third neural network comprises a discriminator.

Clause 8: The method of any preceding clause, wherein the interaction data comprises a first number of features and the generated interaction data comprises the first number of features, wherein at least one random vector comprises a second number of features less than the first number of features, wherein the generator comprises an input for each feature of the second number of features and an output for each feature of the first number of features, wherein the classifier comprises an input for each feature of the first number of features and a single output, and wherein the discriminator comprises an input for each feature of the first number of features and a single output.

Clause 9: The method of any preceding clause, wherein the first neural network comprises at least one of a first multilayer perceptron (MLP), a first fully connected neural network, a first deep neural network, a first convolutional neural network, or any combination thereof, wherein the second neural network comprises at least one of a second MLP, a second fully connected neural network, a second deep neural network, a second convolutional neural network, or any combination thereof, and wherein the third neural network comprises at least one of a third MLP, a third fully connected neural network, a third deep neural network, a third convolutional neural network, or any combination thereof.

Clause 10: The method of any preceding clause, further comprising: receiving, with at least one processor, further interaction data associated with at least one further interaction; and generating, with at least one processor, further fraud label data for the at least one further interaction with the first neural network based on the further interaction data, the further fraud label data for the at least one further interaction associated with whether the first neural network classifies the at least one further interaction as fraudulent.

Clause 11: A system for detecting fraudulent interactions, comprising: at least one processor; and at least one non-transitory computer-readable medium comprising instructions to direct the at least one processor to: receive interaction data associated with a plurality of interactions, the plurality of interactions comprising a first plurality of interactions and a second plurality of interactions different than the first plurality of interactions; receive first fraud label data for each respective interaction of the first plurality of interactions, the first fraud label data associated with whether the respective interaction of the first plurality of interactions is fraudulent; generate second fraud label data for each interaction of the second plurality of interactions with a first neural network based on the interaction data of the second plurality of interactions, the second fraud label data for each respective interaction of the second plurality of interactions associated with whether the first neural network classifies the respective interaction as fraudulent; generate generated interaction data associated with a plurality of generated interactions and generated fraud label data for each generated interaction of the plurality of generated interactions with a second neural network; generate discrimination data for each interaction of the second plurality of interactions and each generated interaction of the plurality of generated interactions with a third neural network based on the interaction data for each interaction of the second plurality of interactions, the second fraud label data, the generated interaction data, and the generated fraud label data, the discrimination data for each interaction or generated interaction associated with whether the third neural network classifies the respective interaction or generated interaction as real or generated; determine first error data for each respective interaction of the second plurality of interactions based on the discrimination data, the first error data for each respective interaction associated with whether the discrimination data for the respective interaction correctly classifies the respective interaction as real; and train the first neural network based on the first error data associated with the interactions of the second plurality of interactions.

Clause 12: The system of clause 11, wherein the instructions further direct the at least one processor to train the first neural network based on the interaction data of the first plurality of transactions and the first fraud label data.

Clause 13: The system of clauses 11 or 12, wherein the instructions further direct the at least one processor to train the first neural network based on the generated interaction data and the generated fraud label data.

Clause 14: The system of any one of clauses 11-13, wherein the instructions further direct the at least one processor to: determine second error data for each generated interaction of the generated interaction data based on the discrimination data, the second error data for each respective generated interaction associated with whether the discrimination data for the respective generated interaction correctly classifies the respective generated interaction as generated; and train the second neural network based on the second error data associated with the generated interactions of the generated interaction data.

Clause 15: The system of any one of clauses 11-14, wherein the instructions further direct the at least one processor to: train the third neural network based on at least one of the first error data, the second error data, the interaction data of the first plurality of transactions, the first fraud label data, or any combination thereof.

Clause 16: The system of any one of clauses 11-15, wherein the instructions further direct the at least one processor to generate at least one random vector, wherein generating the generated interaction data and the generated fraud label data comprises generating the generated interaction data associated with the plurality of generated interactions and the generated fraud label data for each generated interaction of the plurality of generated interactions with the second neural network based on the at least one random vector.

Clause 17: The system of any one of clauses 11-16, wherein the first neural network comprises a classifier, the second neural network comprises a generator, and the third neural network comprises a discriminator.

Clause 18: The system of any one of clauses 11-17, wherein the interaction data comprises a first number of features and the generated interaction data comprises the first number of features, wherein at least one random vector comprises a second number of features less than the first number of features, wherein the generator comprises an input for each feature of the second number of features and an output for each feature of the first number of features, wherein the classifier comprises an input for each feature of the first number of features and a single output, and wherein the discriminator comprises an input for each feature of the first number of features and a single output.

Clause 19: The system of any one of clauses 11-18, wherein the first neural network comprises at least one of a first multilayer perceptron (MLP), a first fully connected neural network, a first deep neural network, a first convolutional neural network, or any combination thereof, wherein the second neural network comprises at least one of a second MLP, a second fully connected neural network, a second deep neural network, a second convolutional neural network, or any combination thereof, and wherein the third neural network comprises at least one of a third MLP, a third fully connected neural network, a third deep neural network, a third convolutional neural network, or any combination thereof.

Clause 20: The system of any one of clauses 11-19, wherein the instructions further direct the at least one processor to: receive further interaction data associated with at least one further interaction; and generate further fraud label data for the at least one further interaction with the first neural network based on the further interaction data, the further fraud label data for the at least one further interaction associated with whether the first neural network classifies the at least one further interaction as fraudulent.

Clause 21: A computer program product for detecting fraudulent interactions, the computer program product comprising at least one non-transitory computer-readable medium including one or more instructions that, when executed by at least one processor, cause the at least one processor to: receive interaction data associated with a plurality of interactions, the plurality of interactions comprising a first plurality of interactions and a second plurality of interactions different than the first plurality of interactions; receive first fraud label data for each respective interaction of the first plurality of interactions, the first fraud label data associated with whether the respective interaction of the first plurality of interactions is fraudulent; generate second fraud label data for each interaction of the second plurality of interactions with a first neural network based on the interaction data of the second plurality of interactions, the second fraud label data for each respective interaction of the second plurality of interactions associated with whether the first neural network classifies the respective interaction as fraudulent; generate generated interaction data associated with a plurality of generated interactions and generated fraud label data for each generated interaction of the plurality of generated interactions with a second neural network; generate discrimination data for each interaction of the second plurality of interactions and each generated interaction of the plurality of generated interactions with a third neural network based on the interaction data for each interaction of the second plurality of interactions, the second fraud label data, the generated interaction data, and the generated fraud label data, the discrimination data for each interaction or generated interaction associated with whether the third neural network classifies the respective interaction or generated interaction as real or generated; determine first error data for each respective interaction of the second plurality of interactions based on the discrimination data, the first error data for each respective interaction associated with whether the discrimination data for the respective interaction correctly classifies the respective interaction as real; and train the first neural network based on the first error data associated with the interactions of the second plurality of interactions.

Clause 22: The computer program product of clause 21, wherein the instructions further cause the at least one processor to train the first neural network based on the interaction data of the first plurality of transactions and the first fraud label data.

Clause 23: The computer program product of clauses 21 or 22, wherein the instructions further cause the at least one processor to train the first neural network based on the generated interaction data and the generated fraud label data.

Clause 24: The computer program product of any one of clauses 21-23, wherein the instructions further cause the at least one processor to: determine second error data for each generated interaction of the generated interaction data based on the discrimination data, the second error data for each respective generated interaction associated with whether the discrimination data for the respective generated interaction correctly classifies the respective generated interaction as generated; and train the second neural network based on the second error data associated with the generated interactions of the generated interaction data.

Clause 25: The computer program product of any one of clauses 21-24, wherein the instructions further cause the at least one processor to: train the third neural network based on at least one of the first error data, the second error data, the interaction data of the first plurality of transactions, the first fraud label data, or any combination thereof.

Clause 26: The computer program product of any one of clauses 21-25, wherein the instructions further cause the at least one processor to generate at least one random vector, wherein generating the generated interaction data and the generated fraud label data comprises generating the generated interaction data associated with the plurality of generated interactions and the generated fraud label data for each generated interaction of the plurality of generated interactions with the second neural network based on the at least one random vector.

Clause 27: The computer program product of any one of clauses 21-26, wherein the first neural network comprises a classifier, the second neural network comprises a generator, and the third neural network comprises a discriminator.

Clause 28: The computer program product of any one of clauses 21-27, wherein the interaction data comprises a first number of features and the generated interaction data comprises the first number of features, wherein at least one random vector comprises a second number of features less than the first number of features, wherein the generator comprises an input for each feature of the second number of features and an output for each feature of the first number of features, wherein the classifier comprises an input for each feature of the first number of features and a single output, and wherein the discriminator comprises an input for each feature of the first number of features and a single output.

Clause 29: The computer program product of any one of clauses 21-28, wherein the first neural network comprises at least one of a first multilayer perceptron (MLP), a first fully connected neural network, a first deep neural network, a first convolutional neural network, or any combination thereof, wherein the second neural network comprises at least one of a second MLP, a second fully connected neural network, a second deep neural network, a second convolutional neural network, or any combination thereof, and wherein the third neural network comprises at least one of a third MLP, a third fully connected neural network, a third deep neural network, a third convolutional neural network, or any combination thereof.

Clause 30: The computer program product of any one of clauses 21-29, wherein the instructions further cause the at least one processor to: receive further interaction data associated with at least one further interaction; and generate further fraud label data for the at least one further interaction with the first neural network based on the further interaction data, the further fraud label data for the at least one further interaction associated with whether the first neural network classifies the at least one further interaction as fraudulent.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIGS. 6A-6C are diagrams of non-limiting embodiments of implementations of neural networks that may be used in non-limiting embodiments of the process shown in FIG. 3, according to the principles of the presently disclosed subject matter.

DESCRIPTION

Figure 1:
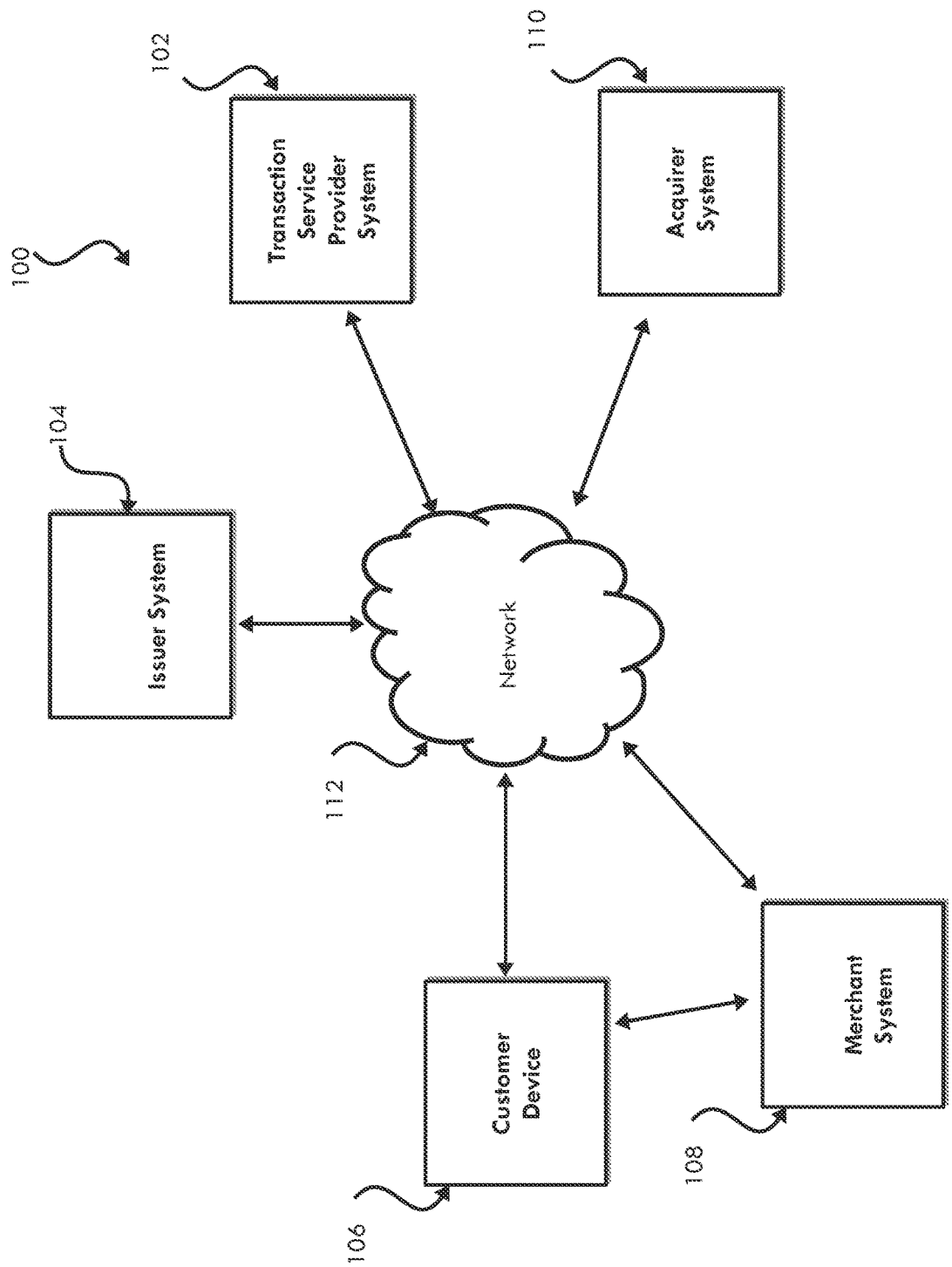
FIG. 1 is a diagram of a non-limiting embodiment of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a token value may be generated such that the recovery of the original PAN or other account identifier from the token value may not be computationally derived (e.g., with a one-way hash or other cryptographic function). Further, in some non-limiting embodiments, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments, token requestor identifiers may be revoked and/or token requestors may be assigned new token requestor identifiers. In some non-limiting embodiments, this information may be subject to reporting and audit by the token service provider.

As used herein, the term a "token service provider" may refer to an entity including one or more server computers in a token service system that generates, processes, and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments, the token service provider may have the ability to set aside licensed BINs as token BINs to issue tokens for the PANs that may be submitted to the token service provider. In some non-limiting embodiments, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments, the token vault may be a part of a token service system. For example, the token vault may be provided as a part of the token service provider. Additionally or alternatively, the token vault may be a remote repository accessible by the token service provider. In some non-limiting embodiments, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to systems, methods, and computer program products for detecting fraudulent interactions, including, but not limited to, detecting fraudulent interactions using multiple neural networks. For example, non-limiting embodiments of the disclosed subject matter provide detecting fraudulent interactions using three neural networks (e.g., a classifier, a generator, a discriminator, and/or the like) to generate labels for unlabeled interaction data (e.g., by the classifier), generate generated (e.g., fake) interaction data (e.g., by the generator), generate discrimination data for the unlabeled interactions and generated interactions (e.g., be the discriminator), and generate error data based on the discrimination data to use for training at least one of the neural networks. Such embodiments provide techniques and systems that reduce (e.g., eliminate, decrease, and/or the like) manual efforts and reduce time spent manually reviewing transactions (e.g., to provide labels to historical transaction data, to identify incoming transactions as fraudulent, and/or the like). Additionally or alternatively, such embodiments provide techniques and systems that accurately provide labels for unlabeled data (e.g., historical data, incoming data, and/or the like). As such, the previously unlabeled data may be used for machine learning (e.g., supervised learning and/or the like) for which it was previously unsuitable (e.g., unusable, usable only after labels were manually assigned, and/or the like). Additionally or alternatively, such embodiments provide techniques and systems that enable detection of new patterns, complex patterns, and/or the like that may not have been previously detectable (e.g., because the small portion of data that was labeled was insufficiently small to train a machine learning model, because predetermined rules are difficult to (manually) adjust in real time and/or when patterns are unknown to the designer, and/or the like). Additionally or alternatively, such embodiments provide techniques and systems that enable training a classifier to accurately label real data based in part on feedback from a discriminator that is discriminating between real and fake (e.g., generated) data. For example, the output and/or error data from the discriminator may be indirectly indicative of the accuracy of such labels provided by the classifier for (real) previously unlabeled data.

For the purpose of illustration, in the following description, while the presently disclosed subject matter is described with respect to methods, systems, and computer program products for detecting fraudulent interactions, e.g., fraudulent payment transactions, one skilled in the art will recognize that the disclosed subject matter is not limited to the illustrative embodiments. For example, the methods, systems, and computer program products described herein may be used with a wide variety of settings, such as detecting fraudulent interactions in any suitable setting, e.g., non-payment transactions, interactions over a network, interactions over social media, and/or the like.

Referring now to FIG. 1, FIG. 1 is a diagram of a non-limiting embodiment of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments, transaction service provider system 102 may be associated with a transaction service provider as described herein. In some non-limiting embodiments, transaction service provider system 102 may be in communication with a data storage device, which may be local or remote to transaction service provider system 102. In some non-limiting embodiments, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments, merchant system 108 may include a computing device, such as a server, a group of servers, a client device, a group of client devices, and/or other like devices. In some non-limiting embodiments, merchant system 108 may be associated with a merchant as described herein. In some non-limiting embodiments, merchant system 108 may include one or more client devices. For example, merchant system 108 may include a client device that allows a merchant to communicate information to transaction service provider system 102. In some non-limiting embodiments, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
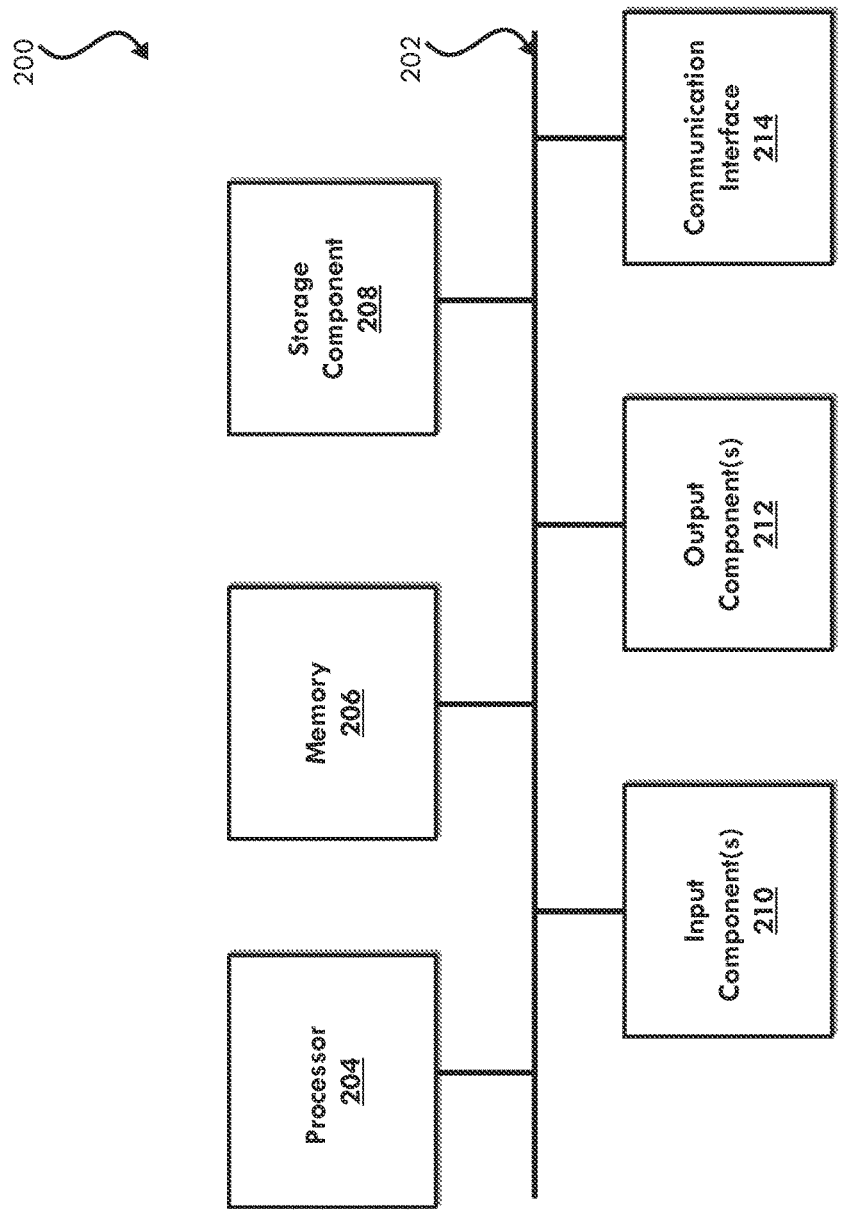
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function.

Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
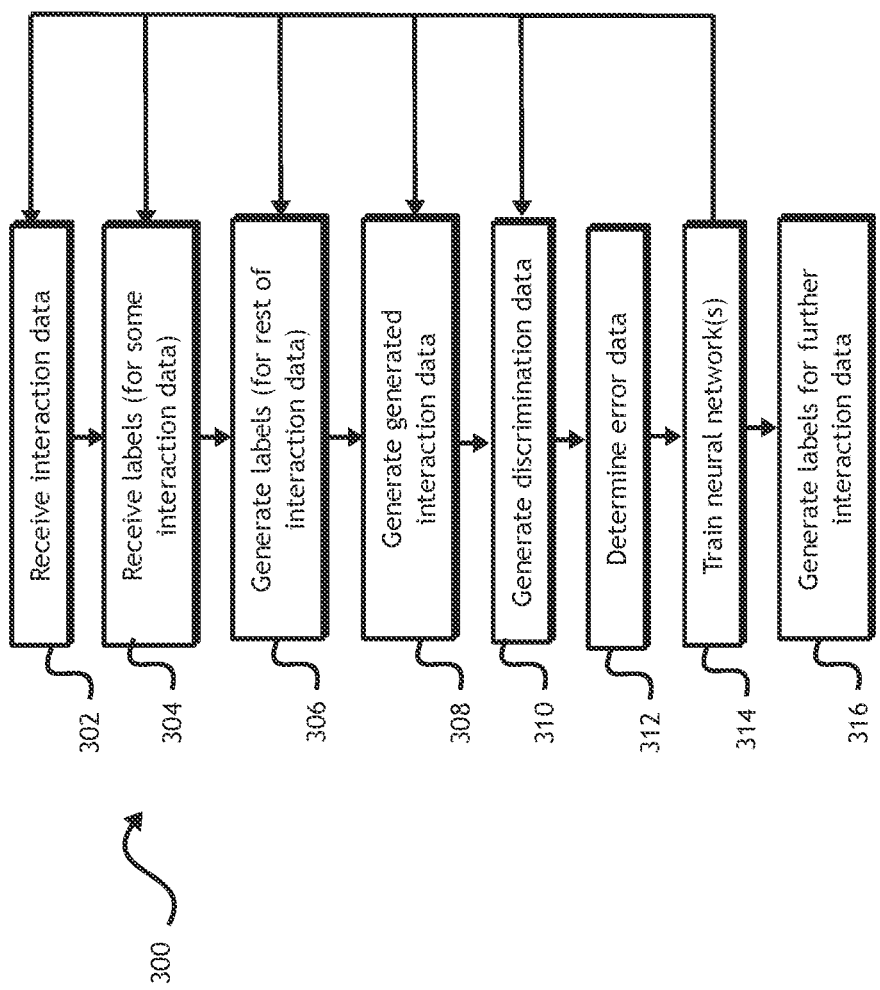
FIG. 3 is a flowchart of a non-limiting embodiment of a process for identifying subpopulations, according to the principles of the presently disclosed subject matter.

Referring now to FIG. 3, FIG. 3 is a flowchart of a non-limiting embodiment of a process 300 for detecting fraudulent interactions. In some non-limiting embodiments, one or more of the steps of process 300 may be performed (e.g., completely, partially, and/or the like) by transaction service provider system 102 (e.g., one or more devices of transaction service provider system 102). In some non-limiting embodiments, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), acquirer system 110 (e.g., one or more devices of acquirer system 110), and/or the like. In some non-limiting embodiments, a central system may be implemented (e.g., completely, partially, and/or the like) by transaction service provider system 102. In some non-limiting embodiments, a central system may be implemented (e.g., completely, partially, and/or the like) by another system, another device, another group of systems, or another group of devices, separate from or including transaction service provider system 102, such as issuer system 104, customer device 106, merchant system 108, acquirer system 110, and/or the like.

As shown in FIG. 3, at step 302, process 300 may include receiving interaction data. For example, a central system (e.g., transaction service provider system 102 and/or the like) may receive interaction data (e.g., payment transaction data, non-payment transaction data, communication data, and/or the like, as described herein) associated with a plurality of interactions. In some non-limiting embodiments, the central system (e.g., transaction service provider system 102 and/or the like) may receive interaction data from at least one other device and/or system separate from the central system (e.g., receive interaction data from at least one of issuer system 104, customer device 106, merchant system 108, acquirer system 110, and/or the like). Additionally or alternatively, the central system (e.g., transaction service provider system 102 and/or the like) may receive (e.g., retrieve and/or the like) at least some of the interaction data from a data storage device, which may be local or remote to the central system.

In some non-limiting embodiments, interaction data may include transaction data (e.g., payment transaction data) associated with a plurality of transactions (e.g., payment transactions). Additionally or alternatively, interaction data may include communication data associated with a plurality of communications (e.g., public and/or private messages, emails, text messages, telephone calls, voice over internet protocol (VoIP) calls, social media posts, web browsing, and/or the like). In some non-limiting embodiments, interaction data may include a plurality of features (e.g., fields, parameters, values, strings, properties, characteristics, measurements, and/or the like).

In some non-limiting embodiments, the plurality of interactions may include a first plurality of interactions and a second plurality of interactions different than the first plurality of interactions. For example, the first plurality of interactions may include interactions for which labels (e.g., fraud labels indicating whether or not each interaction is fraudulent and/or the like, as described herein) are available. Additionally or alternatively, the second plurality of interactions may include interactions for which labels (e.g., fraud labels and/or the like) are not available. For example, the second plurality of interactions may be initially unlabeled.

As shown in FIG. 3, at step 304, process 300 may include receiving labels. For example, a central system (e.g., transaction service provider system 102 and/or the like) may receive label data (e.g., fraud label data and/or the like) for at least some of the interactions (e.g., the first plurality of interactions). In some non-limiting embodiments, the label data (e.g., fraud label data and/or the like) may be included with the interaction data of at least some of the interactions (e.g., the first plurality of interactions), and such label data may be received simultaneously with such interaction data. Additionally or alternatively, the central system (e.g., transaction service provider system 102 and/or the like) may receive label data from at least one other device and/or system separate from the central system (e.g., receive interaction data from at least one of issuer system 104, customer device 106, merchant system 108, acquirer system 110, and/or the like). Additionally or alternatively, the central system (e.g., transaction service provider system 102 and/or the like) may receive (e.g., retrieve and/or the like) at least some of the label data from a data storage device, which may be local or remote to the central system. Additionally or alternatively, the central system (e.g., transaction service provider system 102 and/or the like) may receive at least some of the label data from at least one user device of the central system associated with a user (e.g., an agent tasked with reviewing at least some of the first plurality of interactions to provide a fraud label therefor).

In some non-limiting embodiments, the label data may include fraud label data. For example, the central system (e.g., transaction service provider system 102 and/or the like) may receive (first) fraud label data for each respective interaction of at least some of the interactions (e.g., the first plurality of interactions). Additionally or alternatively, the (first) fraud label data may be associated with whether the respective interaction (e.g., of the first plurality of interactions) is fraudulent. In some non-limiting embodiments, the fraud label data may include a single bit or Boolean value. For example, the fraud label (e.g., bit or Boolean value) may be 1 or "True," respectively, if the associated interaction is fraudulent, and 0 or "False" otherwise. In some non-limiting embodiments, the fraud label data may include two bits or Boolean values. For example, a first bit or Boolean value may be 1 or "True," respectively, if the associated interaction is fraudulent (and 0 or "False" otherwise), and a second bit or Boolean value may be 1 or "True," respectively, if the associated interaction is not fraudulent (and 0 or "False" otherwise). Additionally or alternatively, if both the first bit or Boolean value and second bit or Boolean value 0 or "False," respectively, that may indicate that a label has not been provided (e.g., determined and/or the like). In some non-limiting embodiments, the fraud label data may include a numerical value associated with a probability that the interaction is fraudulent. For example, such numerical value may be a number between 0 and 1, between 0 and 100, and/or the like.

As shown in FIG. 3, at step 306, process 300 may include generating labels (e.g., for initially unlabeled data). For example, a central system (e.g., transaction service provider system 102 and/or the like) may generate (second) label data for at least some interactions (e.g., the second plurality of interactions) with a first neural network (e.g., classifier and/or the like) based on the interaction data (e.g., of each interaction of the second plurality of interactions).

In some non-limiting embodiments, the (second) label data may include (second) fraud label data. For example, the (second) fraud label data for each respective interaction of the second plurality of interactions may be associated with whether the first neural network classifies the respective interaction as fraudulent. In some non-limiting embodiments, the (second) fraud label data may include a single bit or Boolean value, as described herein. Additionally or alternatively, the (second) fraud label data may include two bits or Boolean values, as described herein. Additionally or alternatively, the (second) fraud label data may include a numerical value associated with a probability that the interaction is fraudulent, as described herein. For example, the output of the first neural network (e.g., classifier and/or the like) may be the numerical value.

In some non-limiting embodiments, the central system may input the features of the interaction data to the first neural network (e.g., classifier and/or the like) and/or use the first neural network to generate the (second) label data based on the features of the interaction data. In some non-limiting embodiments, the interaction data may include a first number of features. Additionally or alternatively, the first neural network (e.g., classifier) may include an input for each feature of the first number of features. Additionally or alternatively, the first neural network (e.g., classifier) may include at least one output based on the (second) fraud label data. For example, where the (second) fraud label data includes a single bit or Boolean value, the first neural network (e.g., classifier) may include a single output (e.g., a bit or Boolean value as output). For example, where the (second) fraud label data includes two bits or Boolean values, the first neural network (e.g., classifier) may include two outputs (e.g., two bits or Boolean values as output). For example, where the (second) fraud label data includes a numerical value, the first neural network (e.g., classifier) may include a single output (e.g., a numerical value as output).

In some non-limiting embodiments, the first neural network (e.g., classifier and/or the like) may include at least one of a first multilayer perceptron (MLP), a first fully connected neural network, a first deep neural network, a first convolutional neural network, any combination thereof, and/or the like. For example, the first neural network (e.g., classifier and/or the like) may be a first fully connected neural network including an input layer with at least one input, an output layer with at least one output, and at least one hidden layer between the input layer and the output layer. In some non-limiting embodiments, the at least one hidden layer may include at least three hidden layers, up to five hidden layers, and/or the like.

As shown in FIG. 3, at step 308, process 300 may include generating generated (e.g., fake) interaction data. For example, a central system (e.g., transaction service provider system 102 and/or the like) may generate generated (e.g., fake) interaction data associated with a plurality of generated (e.g., fake) interactions with a second neural network (e.g., generator and/or the like). Additionally or alternatively, the central system may generate generated (e.g., fake) label data (e.g., generated fraud label data and/or the like) for each generated interaction of the plurality of generated interactions with the second neural network (e.g., generator and/or the like). In some non-limiting embodiments, the generated label data (e.g., generated fraud label data and/or the like) may be included with the interaction data of the generated interactions (e.g., of each generated interaction). Additionally or alternatively, such generated label data (e.g., generated fraud label data and/or the like) may be generated simultaneously with such generated interaction data.

In some non-limiting embodiments, generated interaction data may include generated transaction data (e.g., generated payment transaction data) associated with a plurality of generated transactions (e.g., generated payment transactions). Additionally or alternatively, generated interaction data may include communication data associated with a plurality of generated communications (e.g., generated public and/or private messages, emails, text messages, telephone calls, voice over internet protocol (VoIP) calls, social media posts, web browsing, and/or the like). In some non-limiting embodiments, generated interaction data may include a plurality of generated features (e.g., fields, parameters, values, strings, properties, characteristics, measurements, and/or the like). For example, the generated features may resemble the (real) features of the (real) interaction data. Additionally or alternatively, the generated features may include the same number of features and/or the same types of feature as the (real) interaction data.

In some non-limiting embodiments, the generated label data may include generated fraud label data. For example, the generated fraud label data for each respective generated interaction may be associated with whether the second neural network generated the respective generated interaction to resemble a fraudulent interaction. In some non-limiting embodiments, the generated label data may include a single bit or Boolean value, as described herein. Additionally or alternatively, the generated fraud label data may include two bits or Boolean values, as described herein. Additionally or alternatively, the generated fraud label data may include a numerical value associated with a probability that the generated interaction would be classified as fraudulent, as described herein. For example, the output of the second neural network (e.g., generator and/or the like) may include the numerical value.

In some non-limiting embodiments, the central system may generate at least one random vector. For example, the at least one random vector may include a vector of randomly generated features (e.g., randomly generated numerical values and/or the like). Additionally or alternatively, the central system may generate the generated interaction data associated with the plurality of generated interactions and/or the generated fraud label data for each generated interaction of the plurality of generated interactions with the second neural network (e.g., generator and/or the like) based on the at least one random vector. In some non-limiting embodiments, the central system may input the features of the at least one random vector to the second neural network (e.g., generator and/or the like) and/or use the second neural network to generate the generated interaction data and/or the generated (fraud) label data based on the features of the at least one random vector. In some non-limiting embodiments, the generated interaction data may include the first number of features (e.g., the same number of features as the (real) interaction data). Additionally or alternatively, the at least one random vector may include a second number of features less than the first number of features. In some non-limiting embodiments, the second neural network (e.g., the generator and/or the like) may include an input for each feature of the second number of features (e.g., each feature of the at least one random vector). Additionally or alternatively, the second neural network (e.g., the generator and/or the like) may include an output for each feature of the first number of features (e.g., each feature of the generated interaction data and/or generate fraud label data).

In some non-limiting embodiments, the second neural network (e.g., generator and/or the like) may include at least one of a second multilayer perceptron (MLP), a second fully connected neural network, a second deep neural network, a second convolutional neural network, any combination thereof, and/or the like. For example, the second neural network (e.g., generator and/or the like) may be a second fully connected neural network including an input layer with at least one input, an output layer with at least one output, and at least one hidden layer between the input layer and the output layer. In some non-limiting embodiments, the at least one hidden layer may include at least three hidden layers, up to five hidden layers, and/or the like.

As shown in FIG. 3, at step 310, process 300 may include generating discrimination data. For example, a central system (e.g., transaction service provider system 102 and/or the like) may generate discrimination data for each interaction of the second plurality of interactions with a third neural network (e.g., discriminator and/or the like) based on the interaction data for each interaction of the second plurality of interactions and the second fraud label data. Additionally or alternatively, the central system may generate discrimination data for each generated interaction of the plurality of generated interactions with the third neural network (e.g., discriminator and/or the like) based on the generated interaction data and the generated fraud label data. In some non-limiting embodiments, the discrimination data for each interaction or generated interaction may be associated with whether the third neural network classifies the respective interaction or generated interaction as real or generated.

In some non-limiting embodiments, the discrimination data may include a single bit or Boolean value. For example, the discrimination data (e.g., bit or Boolean value) may be 1 or "True," respectively, if the associated interaction (or generated interaction) is classified as real, and 0 or "False" otherwise (or vice versa). In some non-limiting embodiments, the discrimination data may include two bits or Boolean values. For example, a first bit or Boolean value may be 1 or "True," respectively, if the associated interaction (or generated interaction) is classified as fake (and 0 or "False" otherwise), and a second bit or Boolean value may be 1 or "True," respectively, if the associated interaction (or generated interaction) is classified as generated (and 0 or "False" otherwise). In some non-limiting embodiments, the discrimination data may include a numerical value associated with a probability that the interaction (or generated interaction) is fake (or a probability that the interaction or generated interaction is real). For example, such numerical value may be a number between 0 and 1, between 0 and 100, and/or the like.

In some non-limiting embodiments, the interaction data (and/or generated interaction data) may include the first number of features, as described herein. In some non-limiting embodiments, the third neural network (e.g., the discriminator and/or the like) may include an input for each feature of the first number of features. Additionally or alternatively, the third neural network (e.g., discriminator and/or the like) may include at least one output based on the discrimination data. For example, where the discrimination data includes a single bit or Boolean value, the third neural network (e.g., discriminator and/or the like) may include a single output (e.g., a bit or Boolean value as output). For example, where the discrimination data includes two bits or Boolean values, the third neural network (e.g., discriminator and/or the like) may include two outputs (e.g., two bits or Boolean values as output). For example, where the discrimination data includes a numerical value, the third neural network (e.g., discriminator and/or the like) may include a single output (e.g., a numerical value as output).

In some non-limiting embodiments, the third neural network (e.g., discriminator and/or the like) may include at least one of a third multilayer perceptron (MLP), a third fully connected neural network, a third deep neural network, a third convolutional neural network, any combination thereof, and/or the like. For example, the third neural network (e.g., discriminator and/or the like) may be a third fully connected neural network including an input layer with at least one input, an output layer with at least one output, and at least one hidden layer between the input layer and the output layer. In some non-limiting embodiments, the at least one hidden layer may include at least three hidden layers, up to five hidden layers, and/or the like.

As shown in FIG. 3, at step 312, process 300 may include determining error data. For example, a central system (e.g., transaction service provider system 102 and/or the like) may determine error data for each respective interaction (e.g., of the second plurality of interactions) and/or each respective generated interaction. Additionally or alternatively, such determination may be associated with whether the discrimination data for the respective interaction and/or generated interaction correctly classifies the respective interaction as real or fake, respectively.

In some non-limiting embodiments, the central system may determine first error data for each respective interaction of the second plurality of interactions based on the discrimination data. Additionally or alternatively, the first error data for each respective interaction may be associated with whether the discrimination data for the respective interaction correctly classifies the respective interaction as real.

In some non-limiting embodiments, the central system may determine second error data for each generated interaction of the generated interaction data based on the discrimination data. Additionally or alternatively, the second error data for each respective generated interaction may be associated with whether the discrimination data for the respective generated interaction correctly classifies the respective generated interaction as generated.

In some non-limiting embodiments, the form of the error data may depend on the form of the discrimination data. For example, where the discrimination data includes a single bit or Boolean value, error data for each interaction (or generated interaction) may also be a single bit or Boolean value. Additionally or alternatively, error data for each interaction (or generated interaction) may be a 1 or "True," respectively, if the associated interaction (or generated interaction) is classified correctly (e.g., as real or generated, respectively), and 0 or "False" otherwise. For example, where the discrimination data includes two bits or Boolean values, error data for each interaction (or generated interaction) may also be two bits or Boolean values. Additionally or alternatively, a first bit or Boolean value of error data may be 1 or "True," respectively, if the associated interaction (or generated interaction) is correctly classified (and 0 or "False" otherwise), and a second bit or Boolean value of error data may be 1 or "True," respectively, if the associated interaction (or generated interaction) is incorrectly classified (and 0 or "False" otherwise). For example, where the discrimination data includes a numerical value, the error data may also be a numerical value. For the purpose of illustration, the numerical value of error data may be the same as the numerical value of the discrimination data if the interaction (or generated interaction) is incorrectly classified (and 0 otherwise).

In some non-limiting embodiments, error data may include a numerical value indicating an error rate over multiple interactions and/or generated interactions. For example, error data may include a numerical value associated with a decimal between 0 and 1 based on the error rate of the discrimination data in correctly classifying the interactions and/or generated interactions. In some non-limiting embodiments, first error data may include a numerical value associated with a decimal between 0 and 1 based on the error rate of the discrimination data in correctly classifying the interactions of the second plurality of interactions. Additionally or alternatively, second error data may include a numerical value associated with a decimal between 0 and 1 based on the error rate of the discrimination data in correctly classifying the generated interactions of the generated interaction data. In some non-limiting embodiments, error data may include a loss function and/or the like.

As shown in FIG. 3, at step 314, process 300 may include training at least one neural network. For example, a central system (e.g., transaction service provider system 102 and/or the like) may train at least one of the first neural network (e.g., classifier and/or the like), the second neural network (e.g., generator and/or the like), and/or the third neural network (e.g., the discriminator and/or the like). In some non-limiting embodiments, such training may be based on at least some of the error data.

In some non-limiting embodiments, the central system may train the first neural network (e.g., classifier and/or the like) based on first error data associated with the interactions of the second plurality of interactions. Additionally or alternatively, the central system may train the first neural network based on the interaction data of the first plurality of transactions and the first fraud label data. In some non-limiting embodiments, the central system may train the first neural network with the interaction data of the first plurality of transactions and the first fraud label data initially (e.g., before generating the second fraud label data for the second plurality of transactions). Additionally or alternatively, after determining the (first) error data, the central system may train (e.g., retrain and/or the like) the first neural network based on the first error data associated with the interactions of the second plurality of interactions. Additionally or alternatively, after determining the (first) error data, the central system may train (e.g., retrain and/or the like) the first neural network based on any combination of the (first) error data, the first plurality of transactions, and the first fraud label data. In some non-limiting embodiments, the central system may train the first neural network based on the generated interaction data and the generated fraud label data. For example, after generating the generated interaction data, the central system may train (e.g., retrain and/or the like) the first neural network based on the generated interaction data and the generated fraud label data. Additionally or alternatively, after generating the generated interaction data, the central system may train (e.g., retrain and/or the like) the first neural network based on any combination of the (first) error data, the first plurality of transactions, the first fraud label data, the generated interaction data, and the generated fraud label data. In some non-limiting embodiments, the first neural network may be trained to reduce errors associated with the (first) error data.

In some non-limiting embodiments, the central system may train the second neural network (e.g., generator and/or the like) based on second error data associated with the generated interactions of the generated interaction data. In some non-limiting embodiments, the second neural network may be trained to increase errors associated with the (second) error data.

In some non-limiting embodiments, the central system may train the third neural network (e.g., discriminator and/or the like) based on at least one of the first error data and/or the second error data. Additionally or alternatively, the central system may train the third neural network based on the interaction data of the first plurality of transactions and the first fraud label data. In some non-limiting embodiments, the central system may train the third neural network with the interaction data of the first plurality of transactions and the first fraud label data initially (e.g., before generating the discrimination data). Additionally or alternatively, after determining the error data (e.g., the first error data and/or the second error data), the central system may train (e.g., retrain and/or the like) the third neural network based on the error data (e.g., the first error data and/or the second error data). Additionally or alternatively, after determining the error data (e.g., the first error data and/or the second error data), the central system may train (e.g., retrain and/or the like) the third neural network based on any combination of the error data (e.g., the first error data and/or the second error data), the interaction data of the first plurality of transactions, and the first fraud label data. In some non-limiting embodiments, the third neural network may be trained to reduce errors associated with the (first and second) error data.

In some non-limiting embodiments, training of the neural network(s) (e.g., by the central system) may include at least one of back propagation training, gradient descent training, stochastic gradient descent training, batch (or mini-batch) gradient descent training, adaptive gradient training, conjugate gradient training, momentum training, adaptive momentum training, Newton's method/Hessian matrix training, quasi-Newton method training, Levenberg-Marquardt method training, and/or the like.

In some non-limiting embodiments, the central system (e.g., transaction service provider system 102 and/or the like) may continue to iteratively repeat at least one of steps 302, 304, 306, 308, 310, 312, and/or 314. For example, additional interaction data may be received and/or retrieved, as described herein (302). Additionally or alternatively, additional label data may be received for at least some interactions, as described herein (304). Additionally or alternatively, the first neural network may be used to generate label data for unlabeled interactions (e.g., newly received interactions, the same interactions as before but with the benefit of having trained/retrained the first neural network, and/or the like), as described herein (306). Additionally or alternatively, the second neural network may be used to generate new generated interaction data (e.g., with the benefit of having trained/retrained the second neural network), as described herein (308). Additionally or alternatively, the third neural network may be used to generate new discrimination data (e.g., based on the newly received interactions, based on the new labels generates for the second plurality of interactions and/or newly received interactions, based on the new generated interaction data, and/or the like), as described herein (310). Additionally or alternatively, new error data may be determined based on the new discrimination data, as described herein (312). Additionally or alternatively, at least one of the neural networks may be trained (e.g., based on the new error data), as described herein (314). In some non-limiting embodiments, the iterative repetition of at least some of steps 302, 304, 306, 308, 310, 312, and/or 314 may be continued (e.g., by the central system) until a termination condition is satisfied. For example, the termination condition may include at least one of the first error data or the second error data being below a threshold (e.g., accuracy improved so error data decreased below a threshold). Additionally or alternatively, the termination condition may include a marginal difference in at least one of the first error data or the second error data between successive iterations being below a threshold (e.g., error rate did not significantly change between successive iterations or between a selected number of successive iterations). Additionally or alternatively, the termination condition may include a selected total number of iterations.

As shown in FIG. 3, at step 316, process 300 may include generating labels for further interaction data. For example, a central system (e.g., transaction service provider system 102 and/or the like) may receive further interaction data associated with at least one further interaction (e.g., new incoming payment transaction, new communication, and/or the like). Additionally or alternatively, the central system may generate further label data (e.g., further fraud label data and/or the like) for the at least one further interaction with the first neural network (e.g., classifier and/or the like) based on the further interaction data. For example, having been trained, the first neural network (e.g., classifier and/or the like) may be able to accurately classify whether the further interaction is fraudulent. In some non-limiting embodiments, the further fraud label data for the at least one further interaction may be associated with whether the first neural network (e.g., classifier and/or the like) classifies the at least one further interaction as fraudulent.

In some non-limiting embodiments, the further fraud label data may include a single bit or Boolean value, as described herein. Additionally or alternatively, the further fraud label data may include two bits or Boolean values, as described herein. Additionally or alternatively, the further fraud label data may include a numerical value associated with a probability that the further interaction is fraudulent, as described herein. For example, the output of the first neural network (e.g., classifier and/or the like) may include the numerical value.

In some non-limiting embodiments, the further fraud label data may be used to determine a fraud score (e.g., by a scoring platform of the central system). For example, such fraud score may be determined based on the further fraud label data. Additionally or alternatively, such fraud score may be determined based at least in part on other data separate from or including the further fraud label data, such as data from at least one other model (e.g., neural network, classifier model, and/or the like), data from at least one predefined rule, and/or the like.

In some non-limiting embodiments, at least one action (e.g., remedial action) may be taken (e.g., by the central system) based on the further fraud label data. For example, where the interaction is a transaction (e.g., payment transaction), such transaction may be declined/rejected by the central system (e.g., transaction service provider system 102). Additionally or alternatively, such transaction may be flagged (e.g., marked, posted/added to a list, sorted, and/or the like) for review by the central system (e.g., transaction service provider system 102). Additionally or alternatively, at least one message (e.g., alert message and/or the like) may be generated and/or communicated (e.g., to a user device of transaction service provider system 102, issuer system 104, and/or the like) by the central system (e.g., transaction service provider system 102) based on the transaction, and the at least one message may indicate and/or recommend that the transaction be declined/rejected, reviewed, and/or the like. For example, where the interaction is a communication (e.g., public and/or private message, email, text message, telephone call, voice over internet protocol (VoIP) call, social media post, website, and/or the like), such communication may be declined, rejected, and/or deleted by the central system (e.g., spam filter and/or the like). Additionally or alternatively, such communication and/or an account associated with such communication may be flagged (e.g., marked, posted/added to a list, sorted, and/or the like) for review by the central system. Additionally or alternatively, at least one message (e.g., alert message and/or the like) may be generated and/or communicated (e.g., to a user device and/or the like) by the central system based on the communication, and the at least one message may indicate and/or recommend that the communication be declined, rejected, deleted, reviewed, and/or the like.

Figure 4:
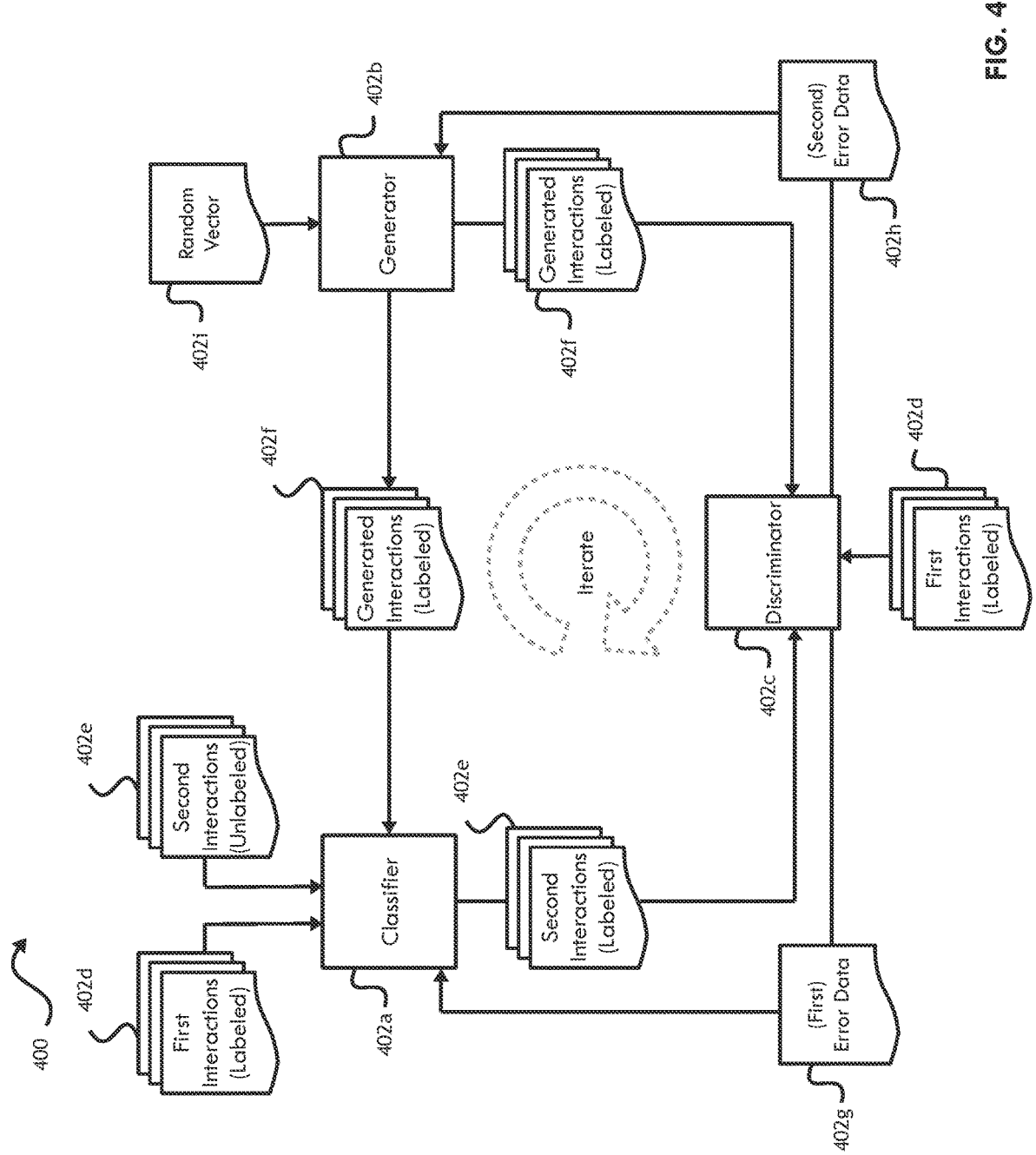
FIG. 4 is a diagram of a non-limiting embodiment of an implementation of a non-limiting embodiment of the process shown in FIG. 3, according to the principles of the presently disclosed subject matter.

Referring now to FIG. 4, FIG. 4 is a diagram of an exemplary implementation 400 of a non-limiting embodiment relating to process 300 shown in FIG. 3. In some non-limiting embodiments or aspects, implementation 400 may be implemented (e.g., completely, partially, and/or the like) by transaction service provider system 102 (e.g., one or more devices of transaction service provider system 102). In some non-limiting embodiments or aspects, implementation 400 may be implemented (e.g., completely, partially, and/or the like) by another system, another device, another group of systems, or another group of devices, separate from or including transaction service provider system 102, such as merchant system 108 (e.g., one or more devices of merchant system 108), issuer system 104 (e.g., one or more devices of issuer system 104), customer device 106, and/or acquirer system 110 (e.g., one or more devices of acquirer system 110). In some non-limiting embodiments, a central system may be implemented (e.g., completely, partially, and/or the like) by transaction service provider system 102. In some non-limiting embodiments, a central system may be implemented (e.g., completely, partially, and/or the like) by another system, another device, another group of systems, or another group of devices, separate from or including transaction service provider system 102, such as issuer system 104, customer device 106, merchant system 108, acquirer system 110, and/or the like.

As shown in FIG. 4, implementation 400 may include classifier 402a, generator 402b, and/or discriminator 402c. In some non-limiting embodiments, classifier 402a may include at least one (e.g., a first) neural network. Additionally or alternatively, generator 402b may include at least one (e.g., a second) neural network. Additionally or alternatively, discriminator 402c may include at least one (e.g., a third) neural network. In some non-limiting embodiments, the classifier 402a may be the same as or similar to the first neural network of the central system (e.g., transaction service provider system 102 and/or the like), as described herein. In some non-limiting embodiments, generator 402b may be the same as or similar to the second neural network of the central system (e.g., transaction service provider system 102 and/or the like), as described herein. In some non-limiting embodiments, discriminator 402c may be the same as or similar to the third neural network of the central system (e.g., transaction service provider system 102 and/or the like), as described herein.

In some non-limiting embodiments, the central system (e.g., transaction service provider system 102 and/or the like) may receive interaction data (e.g., payment transaction data, non-payment transaction data, communication data, and/or the like, as described herein) associated with a plurality of interactions, as described herein. In so1me non-limiting embodiments, the interaction data may include first interactions 402d and second interactions 402e (which may be different than the first interactions 402d). For example, interaction data for first of interactions 402e may include label data (e.g., fraud label data and/or the like), as described herein. Additionally or alternatively, second interactions 402e may initially lack label data (e.g., fraud label data and/or the like), as described herein. In some non-limiting embodiments, classifier 402a and/or discriminator 402c may be initially trained based on the first interactions 402d (including labels thereof), as described herein.

In some non-limiting embodiments, generator 402b may generate generated interactions 402f, as described herein. For example, at least one random vector 402i may be generated (e.g., by the central system), and generator 402b may generate generated interactions 402f based on at least one random vector 402i, as described herein. In some non-limiting embodiments, generated interaction data for generated interactions 402f may include generated label data (e.g., generated fraud label data), as described herein. In some non-limiting embodiments, classifier 402a may be trained based on generated interactions 402f (including generated labels thereof), as described herein. In some non-limiting embodiments, generated interactions 402f (including generated labels thereof) may be provided to discriminator 402c, as described herein.

In some non-limiting embodiments, classifier 402a may generate labels (e.g., second fraud labels) for second interactions 402e, as described herein. Additionally or alternatively, second interactions 402e (including the second fraud labels generated therefor) may be provided to discriminator 402c, as described herein.

In some non-limiting embodiments, discriminator 402c may generate discrimination data, as described herein. For example, discriminator 402c may generate discrimination data based on whether each interaction of second interactions 402e and each generated interaction of generated interaction 402f is real or generated (e.g., fake), as described herein. Additionally, error data may be determined (e.g., by the central system) based on the discrimination data, as described herein. For example, first error data 402g may be determined based on discrimination data associated with second interactions 402e, as described herein. Additionally or alternatively, second error data 402h may be determined based on discrimination data associated with generated interactions 402f, as described herein.

In some non-limiting embodiments, classifier 402a may be trained (e.g., further trained, retrained, and/or the like) based on first error data 402g, as described herein. Additionally or alternatively, generator 402b may be trained (e.g., further trained, retrained, and/or the like) based on second error data 402h, as described herein. Additionally or alternatively, discriminator 402c may be trained (e.g., further trained, retrained, and/or the like) based on first error data 402g, second error data 402h, and/or the like, as described herein.

Figure 5:
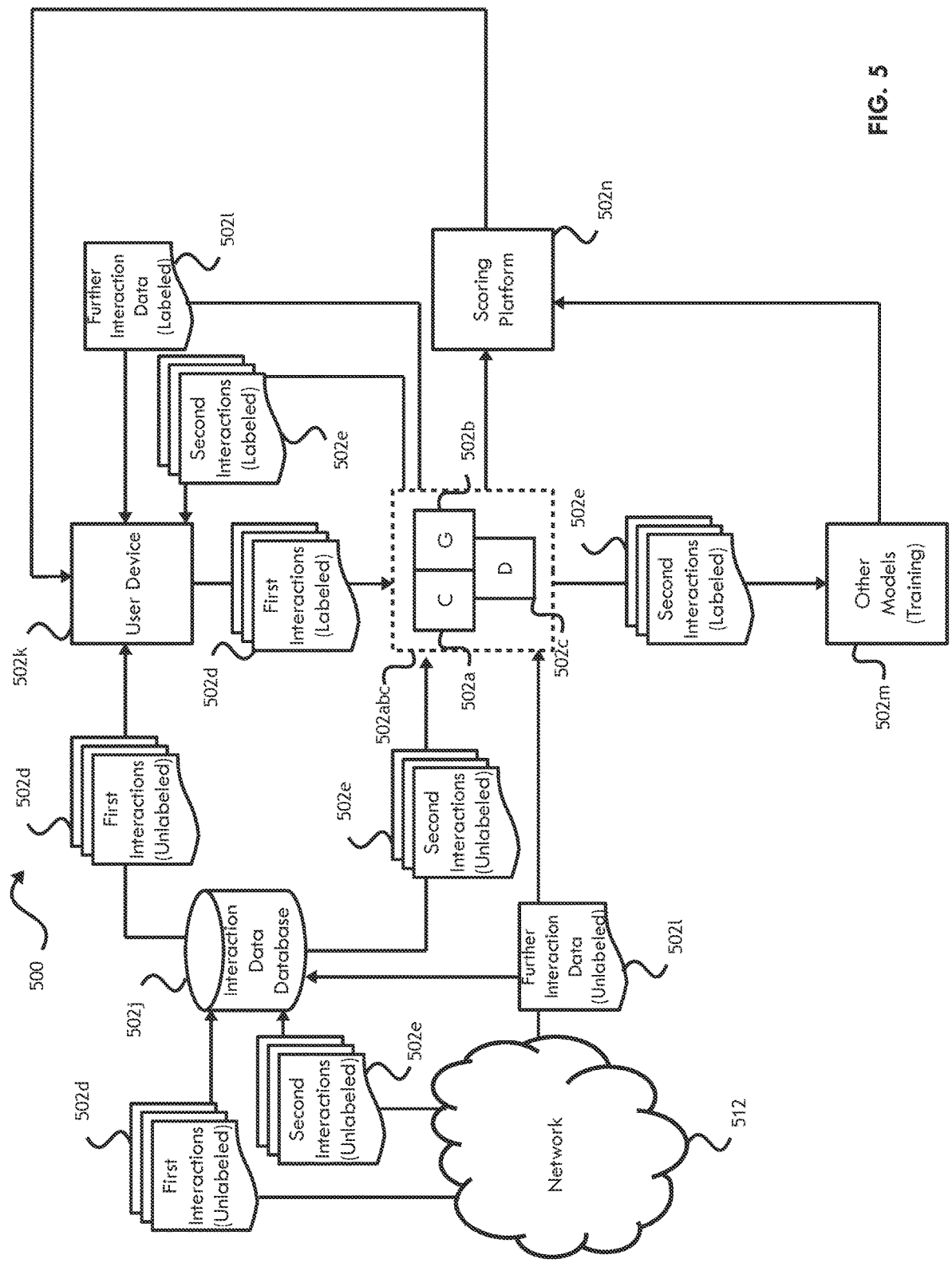
FIG. 5 is a diagram of a non-limiting embodiment of an implementation of a non-limiting embodiment of the process shown in FIG. 3, according to the principles of the presently disclosed subject matter.

Referring now to FIG. 5, FIG. 5 is a diagram of an exemplary implementation 500 of a non-limiting embodiment relating to process 300 shown in FIG. 3. In some non-limiting embodiments or aspects, implementation 500 may be implemented (e.g., completely, partially, and/or the like) by transaction service provider system 102 (e.g., one or more devices of transaction service provider system 102). In some non-limiting embodiments or aspects, implementation 500 may be implemented (e.g., completely, partially, and/or the like) by another system, another device, another group of systems, or another group of devices, separate from or including transaction service provider system 102, such as merchant system 108 (e.g., one or more devices of merchant system 108), issuer system 104 (e.g., one or more devices of issuer system 104), customer device 106, and/or acquirer system 110 (e.g., one or more devices of acquirer system 110).

As shown in FIG. 5, implementation 500 may include interaction data database 502*j*, user device 502*k*, central system 502*abc*, classifier 502*a*, generator 502*b*, discriminator 502*c*, other models 502*m*, scoring platform 502*n*, network 512, and/or the like. In some non-limiting embodiments, central system 502*abc* may be implemented (e.g., completely, partially, and/or the like) by transaction service provider system 102. In some non-limiting embodiments, central system 502*abc* may be implemented (e.g., completely, partially, and/or the like) by another system, another device, another group of systems, or another group of devices, separate from or including transaction service provider system 102, such as issuer system 104, customer device 106, merchant system 108, acquirer system 110, and/or the like. In some non-limiting embodiments, classifier 502*a* may include at least one (e.g., a first) neural network. Additionally or alternatively, generator 502*b* may include at least one (e.g., a second) neural network. Additionally or alternatively, discriminator 502*c* may include at least one (e.g., a third) neural network. In some non-limiting embodiments, the classifier 502*a* may be the same as or similar to classifier 402*a* and/or the first neural network of the central system (e.g., transaction service provider system 102 and/or the like), as described herein. In some non-limiting embodiments, generator 502*b* may be the same as or similar to generator 402*b* and/or the second neural network of the central system (e.g., transaction service provider system 102 and/or the like), as described herein. In some non-limiting embodiments, discriminator 502*c* may be the same as or similar to discriminator 402*d* and/or the third neural network of the central system (e.g., transaction service provider system 102 and/or the like), as described herein. In some non-limiting embodiments, interaction data database 502*j*, user device 502*k*, other models 502*m*, and/or scoring platform 502*n* each may be implemented (e.g., completely, partially, and/or the like) by transaction service provider system 102. In some non-limiting embodiments, at least one of interaction data database 502*j*, user device 502*k*, other models 502*m*, and/or scoring platform 502*n* may be implemented (e.g., completely, partially, and/or the like) by another system, another device, another group of systems, or another group of devices, separate from or including transaction service provider system 102, such as issuer system 104, customer device 106, merchant system 108, acquirer system 110, and/or the like. In some non-limiting embodiments, network 512 may be the same as or similar to network 112.

In some non-limiting embodiments, interaction database 502*j* may receive interaction data (e.g., payment transaction data, non-payment transaction data, communication data, and/or the like, as described herein) associated with a plurality of interactions from network 512, as described herein. In some non-limiting embodiments, the interaction data may include first interactions 502*d*, second interactions 502*e* (which may be different than first interactions 502*d*), and/or further interaction data 502*l* (which may be different than first interactions 502*d* and/or second interaction 502*e*), as described herein. For example, interaction data for first interactions 502*d* may include label data (e.g., fraud label data and/or the like), as described herein. Additionally or alternatively, interaction data for first interactions 502*d* may initially lack label data (e.g., fraud label data and/or the like). Additionally or alternatively, second interactions 502*e* and/or further interaction data 502*l* may initially lack label data (e.g., fraud label data and/or the like), as described herein.

In some non-limiting embodiments, first interactions 502*d* may be provided to (e.g., communicated to, made accessible by, and/or the like) at least one user device 502*k*. At least one user (e.g., an agent of a transaction service provider and/or the like) may manually review first interactions 502*d* using at least one user device 502*k*. For example, such user(s) may provide label data (e.g., fraud label data and/or the like) associated with the interaction data of first interactions 502*d*, as described herein. In some non-limiting embodiments, first interactions 502*d* (including labels thereof) may be provided to (e.g., communicated to, received by, and/or the like) central system 502*abc*. In some non-limiting embodiments, classifier 502*a* and/or discriminator 502*c* may be initially trained (by central system 502*abc*) based on first interactions 502*d* (including labels thereof), as described herein.

In some non-limiting embodiments, second interactions 502*e* may be provided to (e.g., communicated to, received by, and/or the like) central system 502*abc*. Additionally or alternatively, further interaction data 502*l* may be provided to (e.g., communicated to, received by, and/or the like) central system 502*abc*.

In some non-limiting embodiments, generator 502*b* may generate generated interactions, as described herein. For example, at least one random vector may be generated (e.g., by central system 502*abc*), and generator 502*b* may generate generated interactions based on the at least one random vector, as described herein. In some non-limiting embodiments, generated interaction data for generated interactions may include generated label data (e.g., generated fraud label data), as described herein. In some non-limiting embodiments, classifier 502*a* may be trained based on generated interactions (including generated labels thereof), as described herein. In some non-limiting embodiments, generated interactions (including generated labels thereof) may be provided to discriminator 502*c*, as described herein.

In some non-limiting embodiments, classifier 502*a* may generate labels (e.g., second fraud labels, further fraud labels, and/or the like) for second interactions 502*e* and/or further interaction data 502*l*, as described herein. Additionally or alternatively, second interactions 502*e* (including the second fraud labels generated therefor) and/or further interaction data 502*l* (including the further fraud labels generated therefor) may be provided to discriminator 502*c*, as described herein.

In some non-limiting embodiments, discriminator 502*c* may generate discrimination data, as described herein. For example, discriminator 502*c* may generate discrimination data based on whether each interaction of second interactions 502*e*, each interaction of further interaction data 502*l*, and/or each generated interaction of generated interaction 502*f* is real or generated (e.g., fake), as described herein. Additionally or alternatively, error data may be determined (e.g., by central system 502*abc*) based on the discrimination data, as described herein. For example, first error data may be determined based on discrimination data associated with second interactions, as described herein. Additionally or alternatively, second error data may be determined based on discrimination data associated with generated interactions, as described herein.

In some non-limiting embodiments, classifier 502*a* may be trained (e.g., further trained, retrained, and/or the like) based on the first error data, as described herein. Additionally or alternatively, generator 502*b* may be trained (e.g., further trained, retrained, and/or the like) based on the second error data, as described herein. Additionally or alternatively, discriminator 502*c* may be trained (e.g., further trained, retrained, and/or the like) based on the first error data, the second error data, and/or the like, as described herein.

In some non-limiting embodiments, at least one of second interactions 502e (including the second fraud labels generated therefor) and/or further interaction data 502l (including the further fraud labels generated therefor) may be provided to other models 502m. In some non-limiting embodiments, other models 502m may include at least one other model (e.g., neural network, classifier model, and/or the like). In some non-limiting embodiments, other models 502m may use at least one of second interactions 502e (including the second fraud labels generated therefor) and/or further interaction data 502l (including the further fraud labels generated therefor) for training. Additionally or alternatively, other models 502m may determine scores (e.g., fraud scores associated with a probability that the respective interaction is fraudulent and/or the like) based on at least one of second interactions 502e and/or further interaction data 502l.

In some non-limiting embodiments, at least one of second interactions 502e (including the second fraud labels generated therefor) and/or further interaction data 502l (including the further fraud labels generated therefor) may be provided (e.g., communicated to, received by, and/or the like) to scoring platform 502n. Additionally or alternatively, scoring platform 502n may determine an overall fraud score (e.g., an overall probability that the respective interaction is fraudulent and/or the like) for each respective interaction of at least one of second interactions 502e and/or further interaction data 502l. In some non-limiting embodiments, scoring platform 502n may determine the overall fraud score for each respective interaction based on the fraud label data of the respective interaction. Additionally or alternatively, scoring platform 502n may determine the overall fraud score for each respective interaction based at least in part on scores from other models 502m.

In some non-limiting embodiments, at least one interaction of at least one of second interactions 502e and/or further interaction data 502l may be flagged by central system 502abc based on the respective label (e.g., fraud label) thereof, as described herein. Additionally or alternatively, such at least one interaction may be provided to (e.g., communicated to, received by, made accessible by, and/or the like) user device 502k by central system 502abc. In some non-limiting embodiments, at least one interaction of at least one of second interactions 502e and/or further interaction data 502l may be flagged by scoring platform 502n based on the respective overall score thereof. Additionally or alternatively, such at least one interaction may be provided to (e.g., communicated to, received by, made accessible by, and/or the like) user device 502k by scoring platform 502n.

Figure 6A:
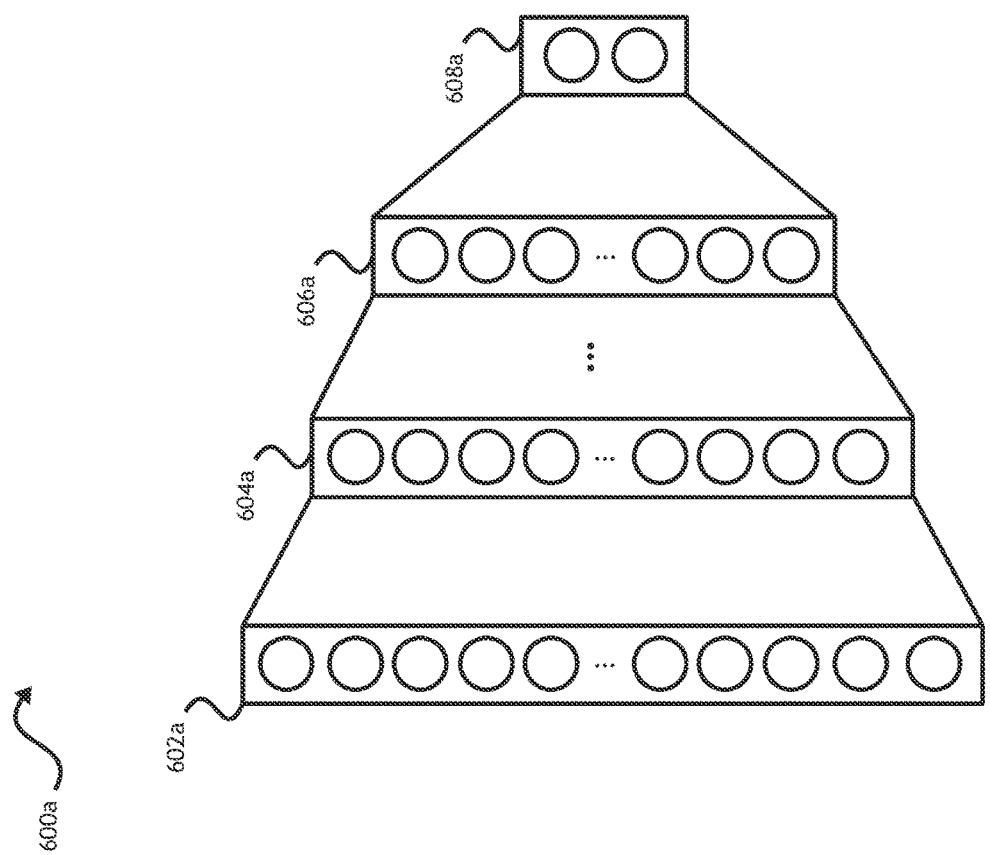

Referring now to FIGS. 6A-6C, FIGS. 6A-6C are diagrams of exemplary implementations of neural networks that may be used in non-limiting embodiments relating to process 300 shown in FIG. 3. In some non-limiting embodiments or aspects, each of neural networks 600a, 600b, 600c may be implemented (e.g., completely, partially, and/or the like) by transaction service provider system 102 (e.g., one or more devices of transaction service provider system 102). In some non-limiting embodiments or aspects, at least one of neural networks 600a, 600b, 600c may be implemented (e.g., completely, partially, and/or the like) by another system, another device, another group of systems, or another group of devices, separate from or including transaction service provider system 102, such as merchant system 108 (e.g., one or more devices of merchant system 108), issuer system 104 (e.g., one or more devices of issuer system 104), customer device 106, and/or acquirer system 110 (e.g., one or more devices of cquirer system 110). In some non-limiting embodiments, neural network 600a may be the same as or similar to classifier 402a, classifier 502a, and/or the first neural network of the central system (e.g., transaction service provider system 102 and/or the like), as described herein. In some non-limiting embodiments, neural network 600b may be the same as or similar to generator 402b, generator 502b, and/or the second neural network of the central system (e.g., transaction service provider system 102 and/or the like), as described herein. In some non-limiting embodiments, neural network 600c may be the same as or similar to discriminator 402d, discriminator 502c, and/or the third neural network of the central system (e.g., transaction service provider system 102 and/or the like), as described herein.

As shown in FIG. 6A, neural network 600a may include a first fully connected neural network including input layer 602a with at least one input (e.g., 100 inputs and/or the like), output layer 608a with at least one output (e.g., 1 output, 2 outputs, and/or the like), and at least one hidden layer (e.g., first hidden layer 604a, last hidden layer 606a, and/or the like) between input layer 602a and the output layer 608a. In some non-limiting embodiments, the at least one hidden layer (e.g., first hidden layer 604a, last hidden layer 606a, and/or the like) may include at least three hidden layers, up to five hidden layers, and/or the like.

In some non-limiting embodiments, the interaction data may include a first number of features (e.g., 100 features and/or the like). Additionally or alternatively, neural network 600a may include an input for each feature of the first number of features. Additionally or alternatively, neural network 600a may include at least one output based on the (second) fraud label data. For example, where the (second) fraud label data includes a single bit or Boolean value, neural network 600a may include a single output (e.g., a bit or Boolean value as output). For example, where the (second) fraud label data includes two bits or Boolean values, neural network 600a may include two outputs (e.g., two bits or Boolean values as output). For example, where the (second) fraud label data includes a numerical value, neural network 600a may include a single output (e.g., a numerical value as output).

As shown in FIG. 6B, neural network 600b may include neural network 600b may include a second fully connected neural network including input layer 602b with at least one input (e.g., 10 inputs and/or the like), an output layer with at least one output (e.g., 100 outputs and/or the like), and at least one hidden layer (e.g., first hidden layer 604b, last hidden layer 606b, and/or the like) between input layer 602b and output layer 608b. In some non-limiting embodiments, the at least one hidden layer (e.g., first hidden layer 604b, last hidden layer 606b, and/or the like) may include at least three hidden layers, up to five hidden layers, and/or the like.

In some non-limiting embodiments, the generated interaction data may include the first number of features (e.g., 100 features, the same number of features as the (real) interaction data, and/or the like). Additionally or alternatively, the random vector may include a second number of features (e.g., 10 features, less than the first number of features, and/or the like). In some non-limiting embodiments, neural network 600b may include an input for each feature of the second number of features (e.g., each feature of the random vector, such as 10 features and/or the like). Additionally or alternatively, neural network 600b may include an output for each feature of the first number of features (e.g., 100 features, each feature of the generated interaction data and/or generated fraud label data, and/or the like).

As shown in FIG. 6C, neural network 600c may include a third fully connected neural network including input l0ayer 602a with at least one input (e.g., 100 inputs and/or the like), output layer 608c with at least one output (e.g., 1 output, 2 outputs, and/or the like), and at least one hidden layer (e.g., first hidden layer 604c, last hidden layer 606c, and/or the like) between input layer 602c and the output layer 608c. In some non-limiting embodiments, the at least one hidden layer (e.g., first hidden layer 604c, last hidden layer 606c, and/or the like) may include at least three hidden layers, up to five hidden layers, and/or the like.

In some non-limiting embodiments, the interaction data (and/or generated interaction data) may include the first number of features (e.g., 100 features and/or the like), as described herein. In some non-limiting embodiments, neural network 600c may include an input for each feature of the first number of features. Additionally or alternatively, neural network 600c may include at least one output based on the discrimination data. For example, where the discrimination data includes a single bit or Boolean value, neural network 600c may include a single output (e.g., a bit or Boolean value as output). For example, where the discrimination data includes two bits or Boolean values, neural network 600c may include two outputs (e.g., two bits or Boolean values as output). For example, where the discrimination data includes a numerical value, neural network 600c may include a single output (e.g., a numerical value as output).

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for detecting fraudulent interactions, comprising:
   receiving, with at least one processor, interaction data associated with a plurality of interactions;
   generating, with at least one processor, fraud label data for each interaction of the plurality of interactions with a first neural network based on the interaction data, the fraud label data for each respective interaction of the plurality of interactions associated with whether the first neural network classifies the respective interaction as fraudulent;
   generating, with at least one processor, generated interaction data associated with a plurality of generated interactions and generated fraud label data for each generated interaction of the plurality of generated interactions with a second neural network;
   generating, with at least one processor, discrimination data for each interaction of the plurality of interactions and each generated interaction of the plurality of generated interactions with a third neural network based on the interaction data for each interaction of the plurality of interactions, the fraud label data, the generated interaction data, and the generated fraud label data, the discrimination data for each interaction or generated interaction associated with whether the third neural network classifies the respective interaction or generated interaction as real or generated;
   determining, with at least one processor, first error data for each respective interaction of the plurality of interactions based on the discrimination data, the first error data for each respective interaction associated with whether the discrimination data for the respective interaction correctly classifies the respective interaction as real; and
   training, with at least one processor, the first neural network based on the first error data associated with the interactions of the plurality of interactions.

2. The method of claim 1, wherein the plurality of interactions comprises a second plurality of interactions, the method further comprising training, with at least one processor, the first neural network based on first interaction data associated with a first plurality of interactions and first fraud label data for each respective interaction of the first plurality of interactions, the first fraud label data associated with whether the respective interaction of the first plurality of interactions is fraudulent.

3. The method of claim 2, further comprising training, with at least one processor, the first neural network based on the generated interaction data and the generated fraud label data.

4. The method of claim 1, further comprising:
   determining, with at least one processor, second error data for each generated interaction of the generated interaction data based on the discrimination data, the second error data for each respective generated interaction associated with whether the discrimination data for the respective generated interaction correctly classifies the respective generated interaction as generated; and
   training, with at least one processor, the second neural network based on the second error data associated with the generated interactions of the generated interaction data.

5. The method of claim 4, further comprising:
   training, with at least one processor, the third neural network based on at least one of the first error data, the second error data, first interaction data associated with a first plurality of interactions, first fraud label data for each respective interaction of the first plurality of interactions associated with whether the respective interaction of the first plurality of interactions is fraudulent, or any combination thereof.

6. The method of claim 1, further comprising generating, with at least one processor, at least one random vector, wherein generating the generated interaction data and the generated fraud label data comprises generating, with at least one processor, the generated interaction data associated with the plurality of generated interactions and the generated fraud label data for each generated interaction of the plurality of generated interactions with the second neural network based on the at least one random vector.

7. The method of claim 1, wherein the first neural network comprises a classifier, the second neural network comprises a generator, and the third neural network comprises a discriminator.

8. The method of claim 7, wherein the interaction data comprises a first number of features and the generated interaction data comprises the first number of features,
   wherein at least one random vector comprises a second number of features less than the first number of features, wherein the generator comprises an input for each feature of the second number of features and an output for each feature of the first number of features, wherein the classifier comprises an input for each feature of the first number of features and a single output, and wherein the discriminator comprises an input for each feature of the first number of features and a single output.

9. The method of claim 1, wherein the first neural network comprises at least one of a first multilayer perceptron (MLP), a first fully connected neural network, a first deep neural network, a first convolutional neural network, or any combination thereof, wherein the second neural network comprises at least one of a second MLP, a second fully connected neural network, a second deep neural network, a second convolutional neural network, or any combination thereof, and wherein the third neural network comprises at least one of a third MLP, a third fully connected neural network, a third deep neural network, a third convolutional neural network, or any combination thereof.

10. The method of claim 1, further comprising:

receiving, with at least one processor, further interaction data associated with at least one further interaction; and generating, with at least one processor, further fraud label data for the at least one further interaction with the first neural network based on the further interaction data, the further fraud label data for the at least one further interaction associated with whether the first neural network classifies the at least one further interaction as fraudulent.

11. A system for detecting fraudulent interactions, comprising:

at least one processor; and at least one non-transitory computer-readable medium comprising instructions to direct the at least one processor to:

receive interaction data associated with a plurality of interactions;

generate fraud label data for each interaction of the plurality of interactions with a first neural network based on the interaction data, the fraud label data for each respective interaction of the plurality of interactions associated with whether the first neural network classifies the respective interaction as fraudulent;

generate generated interaction data associated with a plurality of generated interactions and generated fraud label data for each generated interaction of the plurality of generated interactions with a second neural network;

generate discrimination data for each interaction of the plurality of interactions and each generated interaction of the plurality of generated interactions with a third neural network based on the interaction data for each interaction of the plurality of interactions, the fraud label data, the generated interaction data, and the generated fraud label data, the discrimination data for each interaction or generated interaction associated with whether the third neural network classifies the respective interaction or generated interaction as real or generated;

determine first error data for each respective interaction of the plurality of interactions based on the discrimination data, the first error data for each respective interaction associated with whether the discrimination data for the respective interaction correctly classifies the respective interaction as real; and train the first neural network based on the first error data associated with the interactions of the plurality of interactions.

12. The system of claim 11, wherein the plurality of interactions comprises a second plurality of interactions, wherein the instructions further direct the at least one processor to train the first neural network based on first interaction data associated with a first plurality of interactions and first fraud label data for each respective interaction of the first plurality of interactions, the first fraud label data associated with whether the respective interaction of the first plurality of interactions is fraudulent.

13. The system of claim 12, wherein the instructions further direct the at least one processor to train the first neural network based on the generated interaction data and the generated fraud label data.

14. The system of claim 11, wherein the instructions further direct the at least one processor to:

determine second error data for each generated interaction of the generated interaction data based on the discrimination data, the second error data for each respective generated interaction associated with whether the discrimination data for the respective generated interaction correctly classifies the respective generated interaction as generated; and train the second neural network based on the second error data associated with the generated interactions of the generated interaction data.

15. The system of claim 14, wherein the instructions further direct the at least one processor to:

train the third neural network based on at least one of the first error data, the second error data, first interaction data associated with a first plurality of interactions, first fraud label data for each respective interaction of the first plurality of interactions associated with whether the respective interaction of the first plurality of interactions is fraudulent, or any combination thereof.

16. The system of claim 11, wherein the instructions further direct the at least one processor to generate at least one random vector, wherein generating the generated interaction data and the generated fraud label data comprises generating the generated interaction data associated with the plurality of generated interactions and the generated fraud label data for each generated interaction of the plurality of generated interactions with the second neural network based on the at least one random vector.

17. The system of claim 11, wherein the first neural network comprises a classifier, the second neural network comprises a generator, and the third neural network comprises a discriminator, wherein the interaction data comprises a first number of features and the generated interaction data comprises the first number of features, wherein at least one random vector comprises a second number of features less than the first number of features, wherein the generator comprises an input for each feature of the second number of features and an output for each feature of the first number of features, wherein the classifier comprises an input for each feature of the first number of features and a single output, and wherein the discriminator comprises an input for each feature of the first number of features and a single output.

18. The system of claim 11, wherein the first neural network comprises at least one of a first multilayer perceptron (MLP), a first fully connected neural network, a first deep neural network, a first convolutional neural network, or any combination thereof,
   wherein the second neural network comprises at least one of a second MLP, a second fully connected neural network, a second deep neural network, a second convolutional neural network, or any combination thereof, and
   wherein the third neural network comprises at least one of a third MLP, a third fully connected neural network, a third deep neural network, a third convolutional neural network, or any combination thereof.

19. The system of claim 11, wherein the instructions further direct the at least one processor to:
   receive further interaction data associated with at least one further interaction; and
   generate further fraud label data for the at least one further interaction with the first neural network based on the further interaction data, the further fraud label data for the at least one further interaction associated with whether the first neural network classifies the at least one further interaction as fraudulent.

20. A computer program product for detecting fraudulent interactions, the computer program product comprising at least one non-transitory computer-readable medium including one or more instructions that, when executed by at least one processor, cause the at least one processor to:
   receive interaction data associated with a plurality of interactions;
   generate fraud label data for each interaction of the plurality of interactions with a first neural network based on the interaction data of the plurality of interactions, the fraud label data for each respective interaction of the plurality of interactions associated with whether the first neural network classifies the respective interaction as fraudulent;
   generate generated interaction data associated with a plurality of generated interactions and generated fraud label data for each generated interaction of the plurality of generated interactions with a second neural network;
   generate discrimination data for each interaction of the plurality of interactions and each generated interaction of the plurality of generated interactions with a third neural network based on the interaction data for each interaction of the plurality of interactions, the fraud label data, the generated interaction data, and the generated fraud label data, the discrimination data for each interaction or generated interaction associated with whether the third neural network classifies the respective interaction or generated interaction as real or generated;
   determine first error data for each respective interaction of the plurality of interactions based on the discrimination data, the first error data for each respective interaction associated with whether the discrimination data for the respective interaction correctly classifies the respective interaction as real; and
   train the first neural network based on the first error data associated with the interactions of the plurality of interactions.

* * * * *